United States Patent
Mori et al.

(10) Patent No.: US 7,234,786 B2
(45) Date of Patent: Jun. 26, 2007

(54) VEHICULAR BRAKE CONTROL APPARATUS AND VEHICULAR BRAKE CONTROL METHOD

(75) Inventors: Yukio Mori, Kariya (JP); Kazutaka Kato, Kariya (JP); Kazuhiro Kamiya, Kariya (JP); Masahiro Matsuura, Kariya (JP)

(73) Assignee: Advics Co., Ltd., Aichi-ken (JP)

( * ) Notice: Subject to any disclaimer, the term of this patent is extended or adjusted under 35 U.S.C. 154(b) by 34 days.

(21) Appl. No.: 11/075,654

(22) Filed: Mar. 10, 2005

(65) Prior Publication Data
US 2005/0206236 A1    Sep. 22, 2005

(30) Foreign Application Priority Data
Mar. 18, 2004 (JP) ............... 2004-078048
Oct. 13, 2004 (JP) ............... 2004-298760

(51) Int. Cl.
*B60T 8/32* (2006.01)

(52) U.S. Cl. ............... 303/191; 303/167; 303/11; 303/155; 303/193

(58) Field of Classification Search ............... 303/3, 303/15, 125, 167, 10, 11, 155, 175, 191, 193, 303/20, 167 X, 11 X, 155 X, 175 X, 193 X
See application file for complete search history.

(56) References Cited

U.S. PATENT DOCUMENTS

| | | | |
|---|---|---|---|
| 5,924,508 A | 7/1999 | Clauss et al. | |
| 6,216,079 B1* | 4/2001 | Matsuda | 701/70 |
| 6,219,610 B1* | 4/2001 | Araki | 701/72 |
| 6,292,753 B1* | 9/2001 | Sugimoto et al. | 701/301 |
| 6,473,681 B1* | 10/2002 | Eckert et al. | 701/70 |
| 6,474,753 B1* | 11/2002 | Rieth et al. | 303/191 |
| 2004/0019426 A1* | 1/2004 | Knoop et al. | 701/301 |

* cited by examiner

*Primary Examiner*—Devon Kramer
(74) *Attorney, Agent, or Firm*—Posz Law Group, PLC

(57) ABSTRACT

A vehicular brake control apparatus detects risky occasions and locations that may be risky by using, for example, an infrastructure information input device or a navigation device, and, for such locations and the like, performs the pre-charge so that braking force will be promptly generated. Therefore, the pre-charge can be precisely performed under necessary circumstances, irrespectively of the driver's accelerator operation. Hence, when the driver depresses the brake pedal at such a location or the like, braking force will be promptly generated. Thus, accidents and the like can be prevented.

20 Claims, 13 Drawing Sheets

VEHICULAR BRAKE CONTROL APPARATUS AND VEHICULAR BRAKE CONTROL METHOD

CROSS REFERENCE TO RELATED APPLICATION

This application is based upon and claims the benefit of Japanese Patent Application No. 2004-078048 filed on Mar. 18, 2004 and No. 2004-298760 filed on Oct. 13, 2004, the content of which are incorporated herein by reference.

FIELD OF THE INVENTION

The present invention relates to a vehicular brake control apparatus and a vehicular brake control method for causing a brake mechanism that generates braking force on a vehicle by pressing a friction-applying member, such as a brake pad or the like, against a friction-receiving member and therefore generating friction force to promptly generate braking force by applying pressurizing force beforehand to the friction-applying member.

BACKGROUND OF THE INVENTION

In a conventional brake control apparatus, an ineffective stroke in a brake caliper, for example, a gap between a brake pad and a disc rotor, can be eliminated beforehand by applying pressurizing force to the brake pad (e.g., Japanese Patent Application Laid Open No. HEI 10-157585).

In this brake control apparatus, a wheel cylinder (hereinafter, referred to as "W/C") provided separately for each tire wheel is pre-charged with a pressure (W/C pressure) in accordance with the releasing speed of the accelerator pedal so as to substantially eliminate the ineffective stroke in the brake caliper prior to engagement of the brake. Therefore, when a brake engaging mode is entered, braking force is promptly generated.

However, since the pre-charge of W/C pressure is performed in accordance with the releasing speed of the accelerator pedal, the aforementioned conventional brake control apparatus has the following drawbacks. That is, if a need for brake engagement suddenly arises, for example, in a case where the accelerator pedal is slowly being released or a case where the accelerator pedal has been in an undepressed state, the ineffective stroke in the brake caliper cannot be eliminated beforehand, and therefore the prompt generation of braking force cannot be achieved.

Furthermore, since the conventional brake control apparatus performs the pre-charge of W/C pressure on the basis of the releasing speed of the accelerator pedal alone, the pre-charge is executed irrespectively of surrounding environments, that is, may be executed even when the pre-charge is not needed. Therefore, uncomfortable brake feeling may be caused to a driver.

SUMMARY OF THE INVENTION

Accordingly, an object of the present invention is to provide a vehicular brake control apparatus and a vehicular brake control method capable of precisely performing the pre-charge under a circumstance where the prompt generation of braking force is needed.

It is another object of the present invention to provide a vehicular brake control apparatus and a vehicular brake control method capable of preventing or curbing the uncomfortable brake feeling caused to a driver by unnecessary performance of the pre-charge.

According to a first aspect of the present invention, risky occasions, and locations that may be risky are detected by determining whether the ambient environment detected by a surrounding environment detector device meets a predetermined criterion, and the pre-charge is performed for such locations and the like. Therefore, the pre-charge can be precisely performed under necessary circumstances irrespectively of the driver's accelerator operation, so that braking force is promptly generated when the driver depresses the brake pedal at such a location or the like. This makes it possible to prevent accidents or the like.

Furthermore, since the vehicular brake control apparatus performs the pre-charge in accordance with ambient environments, unnecessarily frequent performance of the pre-charge is avoided, that is, the pre-charge is not performed when it is not needed, but is performed only when it is truly needed, for example, at emergency occasions and the like. Therefore, it becomes possible to avoid discomforting the driver about brake feeling.

For example, the surrounding environment detector device may include an infrastructure information input device capable of acquiring infrastructure information as an ambient environment. In this construction, a pre-charge permission determination portion determines whether the infrastructure information detected by the infrastructure information input device meets a predetermined criterion. In accordance with a result of the determination, the pre-charge permission determination portion causes a braking force control device to execute the pre-charge control.

Therefore, it becomes possible to perform the pre-charge control based on the infrastructure information, for example, information that cannot be obtained only via the sensors provided in the vehicle.

The surrounding environment detector device may include a navigation device that stores a road map and road information regarding roads contained in the road map. In this construction, using the navigation device, information regarding a road that the vehicle follows is detected as the ambient environment. On the basis of the road information and the road map stored in the navigation device, it is determined by the pre-charge permission determination portion whether the present road requires that the driver's attention be called. If it is determined that the road requires that the driver's attention be called, the braking force control device is caused to execute the pre-charge control.

Therefore, if the present road is a road requiring that driver's attention be called, for example, a road requiring a stop for safety, a road that may possibly be busy with pedestrians and the like, a road used for school commutation, a road that has blind corners and the like so that drivers cannot easily grasp conditions ahead, etc., it is possible to perform the pre-charge control suitable to such a road.

In the foregoing construction, the surrounding environment detector device may include a vehicle speed detector device that produces an output corresponding to a vehicle speed of the vehicle. In this construction, the pre-charge permission determination portion may determine whether there is possibility of the vehicle overrunning a stop-requiring position or a vicinity of the stop-requiring position, or whether there is possibility of the vehicle overrunning an intersection that is not equipped with a traffic signal or a vicinity of the intersection, from a present vehicle speed on the basis of the output of the vehicle speed detector and the road information and the road map stored in the navigation device. If it is determined that there is such possibility, the braking force control device is caused to execute the pre-charge control.

Therefore, if it is determined from the present vehicle speed that there is possibility of the vehicle overrunning a stop-requiring position or a vicinity of the stop-requiring position, or whether there is possibility of the vehicle overrunning an intersection that is not equipped with a traffic signal or a vicinity of the intersection, it is possible to perform the pre-charge control suitable to such a situation.

Furthermore, the surrounding environment detector device may include a right-and-left turn detector device that detects whether the vehicle is about to turn right or left. In this construction, it is determined by the pre-charge permission determination portion whether there is possibility of the vehicle turning right or left on the basis of an output of the right-and-left turn detector device and the road information and the road map stored in the navigation device. If it is determined that there is possibility of the vehicle turning right or left, the braking force control device is caused to execute the pre-charge control.

Therefore, if the vehicle is about to turn right or left, the pre-charge control can be performed in advance.

In the foregoing construction, the surrounding environment detector device may include a vehicle speed detector device that produces an output corresponding to a vehicle speed of the vehicle. In this construction, it is determined by the pre-charge permission determination portion whether the vehicle is about to turn right or left in a situation where the vehicle starts to run again after verification of a stop of the vehicle at an intersection on the basis of the output of the right-and-left turn detector device, the output of the vehicle speed detector device, and the road information and the road map stored in the navigation device. If the determination is affirmative, the braking force control device is caused to execute the pre-charge control.

Still further, the surrounding environment detector device may include a behavior detector device that produces an output corresponding to a driver's behavior. In this construction, it is determined by the pre-charge permission determination portion whether the driver's behavior corresponds to a road route that the vehicle is to follow on the basis of the output of the behavior detector device and the road information and the road map stored in the navigation device. If the driver's behavior does not correspond to the road route, the braking force control device is caused to execute the pre-charge control.

Therefore, if the driver's behavior does not correspond to a road route that the vehicle is to follow, the pre-charge control can be performed suitably to such a situation.

According to still another form of the present invention, the pre-charge may be ended only when the amount of pressurization generated by operation of a brake operating member becomes greater than the amount of pressurization generated by the pre-charge.

Therefore, if the driver operates the brake operating member only slightly during the pre-charge, the pre-charge is not ended.

In yet another form of the present invention, the amount of brake fluid used for the pre-charge control may be set at different values for individual brake calipers provided for the wheels, in accordance with the specifications of the brake calipers.

By setting the amount of brake fluid needed for the pre-charge at amounts appropriate to the individual brake calipers in the foregoing manner, it becomes possible to execute more suitable pre-charge.

In a further form of the present invention, the vehicle speed may be detected by the surrounding environment detector device, and the amount of brake fluid used for executing the pre-charge is controlled to an amount corresponding to the vehicle speed by the pre-charge permission determination portion.

If the amount of brake fluid for executing the pre-charge is set in accordance with the vehicle speed, it becomes possible to execute the pre-charge suitably in accordance with the vehicle speed.

For example, if the pre-charge permission determination portion determines from the output of the vehicle speed detector device that the vehicle speed is lower than a predetermined vehicle speed, the braking force control device may cause the amount of brake fluid used for executing the pre-charge control to become less than the amount of brake fluid that is used for the pre-charge control when the vehicle speed is higher than or equal to the predetermined vehicle speed, or omits execution of the pre-charge control.

Thus, if the effect of the pre-charge becomes low as in the case where the vehicle speed is lower than a predetermined vehicle speed, the amount of brake fluid used for the pre-charge may be set at a reduced amount, or performance of the pre-charge may be omitted.

Furthermore, the braking force control device may increase the amount of brake fluid used for executing the pre-charge in accordance with increase in the vehicle speed on the basis of the output of the vehicle speed detector device.

By increasing the amount of brake fluid used for the pre-charge with increase in the vehicle speed in the aforementioned manner, it becomes possible to execute the pre-charge corresponding to the velocity dependency of the brake pads.

In a further form of the present invention, if a braking operation of a preceding vehicle occurs, the pre-charge may be performed as a risk is assumed in such a situation.

Therefore, even if the preceding vehicle decelerates and rapidly approaches, it is possible to correspondingly generate braking force.

In a preferable form as for example, the pre-charge permission determination portion may determine whether a condition that an inter-vehicle distance to the preceding vehicle detected from an output of the distance detector device is less than a first predetermined value and that a relative speed with respect to the preceding vehicle determined from a rate of change of the inter-vehicle distance is greater than a second predetermined value is met. If this condition is met, the braking force control device executes the pre-charge control.

This arrangement avoids the pre-charge in the cases where the inter-vehicle distance to a preceding vehicle is so great that there is substantially no degree of risk and in the cases where the relative speed to a preceding vehicle is substantially zero or negative and therefore there is substantially no possibility of the host vehicle catching up with the preceding vehicle, since there is no need for the pre-charge in these cases. By avoiding unnecessary performance of the pre-change in this manner, the driver's brake feeling can be improved.

In a further form of the present invention, if a laterally adjacent vehicle is about to cut in front of the host vehicle, the pre-charge may be performed as a risk is assumed in such a situation.

This arrangement allows braking force to be generated in quick response to a laterally adjacent vehicle cutting in front of the host vehicle.

In a preferable form as for example, the pre-charge permission determination portion may determine whether a condition that an inter-vehicle distance to the laterally adjacent vehicle detected from an output of the distance detector device is less than a third predetermined value and that a relative speed with respect to the laterally adjacent vehicle is greater than a fourth predetermined value is met. If this condition is met, the braking force control device executes the pre-charge control.

This arrangement also avoids unnecessary performance of the pre-change, and therefore can improve the driver's brake feeling.

It should be apparent that the techniques of executing the pre-charge in accordance with a predetermined ambient environment are not necessarily limited to substantial apparatuses or the like, but function in the form of methods and the like.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
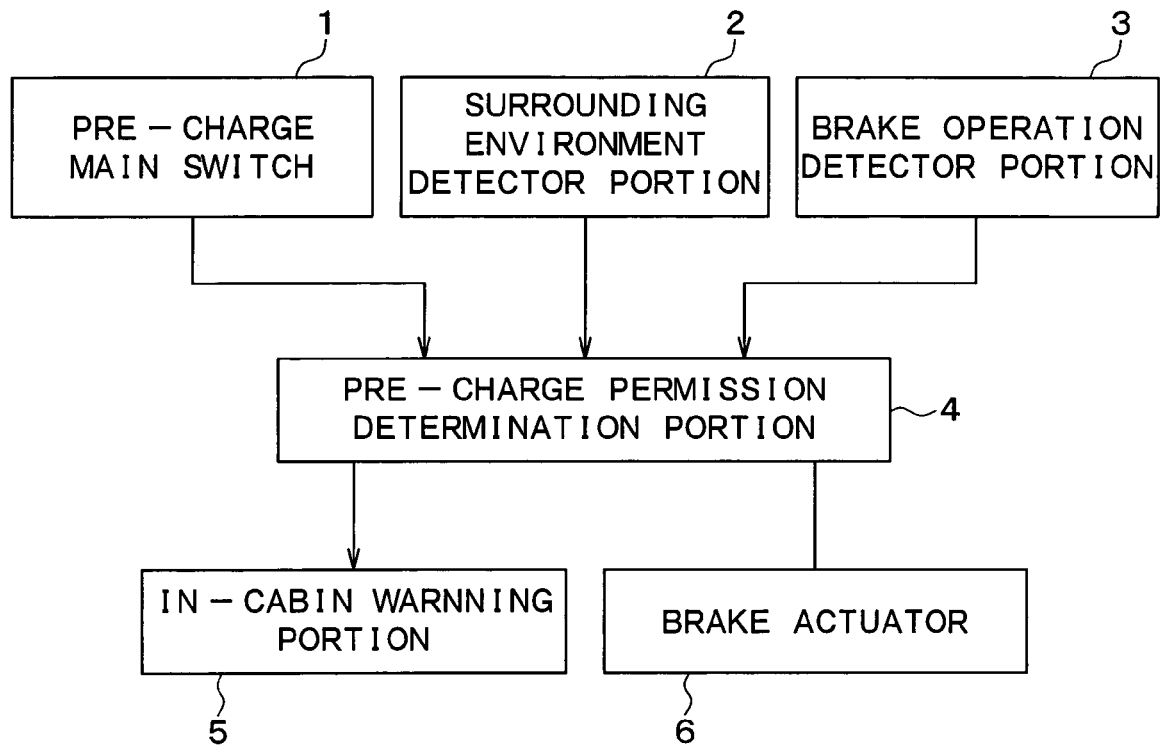
FIG. 1 is a block diagram illustrating a construction of a vehicular brake control apparatus in accordance with a first embodiment of the present invention.

The present invention will be described further with reference to various embodiments in the drawings.

First Embodiment

A block diagram of a vehicular brake control apparatus to which an embodiment of the present invention is applied is shown in FIG. 1. This vehicular brake control apparatus can be installed in practically any vehicle, such as an engine-installed vehicle, an electric vehicle, etc. A construction of the vehicular brake control apparatus will be described hereinafter with reference to FIG. 1.

As shown in FIG. 1, the vehicular brake control apparatus includes a pre-charge main switch 1, a surrounding environment detector portion 2, a brake operation detector portion 3, a pre-charge permission determination portion 4, an in-cabin warning portion 5, and a brake actuator 6 corresponding to a braking force control device.

The pre-charge main switch 1 is disposed in, for example, an instrument panel in a vehicle cabin, and is provided for the on/off switching operation of a driver. The pre-charge main switch 1 serves as a switch for selecting whether to activate the vehicular brake control apparatus in this embodiment. A signal indicating the state of on/off switching of the pre-charge main switch 1 is input to the pre-charge permission determination portion 4. On the basis of the signal, the pre-charge permission determination portion 4 determines whether to execute pre-charge control processing.

The surrounding environment detector portion 2 is provided for detecting an environment around a vehicle and the state of run of the host vehicle. The surrounding environment detector portion 2 outputs an electric signal that serves as a reference for use in determining whether the vehicle is in an environment where the pre-charge needs to be performed, such as a risky location or a situation that may be risky. Examples of the surrounding environment detector portion 2 include an infrastructure information input device, a vehicular speed sensor, a steering angle sensor, a navigation device, an image recognition device, an obstacle recognizing sensor, etc.

The infrastructure information input device is a device for acquiring the information that cannot be obtained only via the sensors provided in the vehicle, by using vehicle-to-vehicle communication or road-to-vehicle communication or the like. For example, the device acquires infrastructure information prepared by an AHS system. For example, the infrastructure information input device makes it possible to obtain surrounding circumstance information obtained via cameras disposed at intersections and the like and to output an electric signal indicating information regarding an intersection through which the vehicle is to pass to the pre-charge permission determination portion 4.

The vehicle speed sensor is a device for outputting an output signal corresponding to the speed of the vehicle equipped with a vehicular brake control apparatus. Although the vehicle speed sensor is cited herein as an example of a vehicle speed detector device, the vehicle speed sensor may also be replaced by tire wheel speed sensors, which are becoming common equipment of vehicles. In that case, each tire wheel speed sensor outputs a detection signal corresponding to the tire wheel speed. Therefore, the vehicle speed may be determined by the pre-charge permission determination portion 4 on the basis of the detection signals. If a brake ECU or another ECU determines vehicle speed from the detection signals from the tire wheel speed sensors, the pre-charge permission determination portion 4 may receive a signal regarding the vehicle speed from the brake ECU or the like.

The steering angle sensor outputs, as a detection signal, a signal corresponding to the amount of steering operation performed by a driver. On the basis of the detection signal from the steering angle sensor, the cornering state of the vehicle can be determined.

The navigation device stores road maps providing information regarding intersections, curves, etc., and information regarding individual roads within the road maps, for example, information that a road requires a stop for safety, information that a road may possibly be busy with pedestrians and the like, information that a road is used for school commutation, information that a road has blind corners and the like so that drivers cannot easily grasp conditions ahead, etc., that is, various information indicating roads that require the pre-charge. The stored information can be output as electric signals from the navigation device to the pre-charge permission determination portion 4.

The image recognition device is capable of capturing conditions present ahead of the vehicle or within the cabin as images, for example, a vehicle-installed camera or the like. On the basis of image data of pictures taken by the vehicle-installed camera, it is possible to perform an analysis for a pedestrian or the like ahead of the vehicle and an analysis for the direction of the line of vision of a driver. The image data provided by the image recognition device or the information regarding pedestrians obtained after the analysis of image data can be output as electric signals to the pre-charge permission determination portion 4.

The obstacle recognizing sensor is a sensor for detecting conditions ahead of the vehicle or adjacent to the vehicle. For example, the sensor is designed so as to detect the distance to an obstacle, such as a pedestrian or the like, by using laser, ultrasonic waves, infrared rays or the like. Specific examples of the obstacle recognizing sensor include a laser radar that applies laser beams to an area ahead of the vehicle, and receives reflected light therefrom, and computes the distance to a preceding vehicle on the basis of the interval between the laser emission time and the laser reception time, a night vision device that displays conditions ahead of the vehicle captured via infrared radiation at night, etc. Detection signals from the obstacle recognizing sensor, that is, an electric signal indicating the distance to an obstacle, an electric signal indicating image data regarding conditions ahead of the vehicle or information regarding pedestrians or the like obtained after analysis of image data, etc., can be output to the pre-charge permission determination portion 4.

The brake operation detector portion 3 outputs an electric signal corresponding to the operation of the brake pedal (brake operating member) performed by a driver. Examples of the brake operation detector portion 3 include a stroke sensor that outputs an electric signal corresponding to the amount of stroke of the brake pedal, and a depressing force sensor that outputs an electric signal corresponding to the depressing force applied to the brake pedal. On the basis of the electric signals from the brake operation detector portion 3, it is determined whether the brake pedal is operated.

The pre-charge permission determination portion 4 is formed by a microcomputer that has a CPU, a ROM, a RAM, an I/O unit, etc. The pre-charge permission determination portion 4 executes a pre-charge determining processing in accordance with programs stored in the ROM.

Specifically, the pre-charge permission determination portion 4 is designed to receive electric signals input from the pre-charge main switch 1 and the surrounding environment detector portion 2. When an electric signal that causes execution of a pre-charge control processing is input from the pre-charge main switch 1, the pre-charge permission determination portion 4 allows execution of the pre-charge control processing on the basis of the electric signal from the surrounding environment detector portion 2.

The ROM of the pre-charge permission determination portion 4 stores a predetermined criterion for determining whether to execute the pre-charge. Then, if the environment around the vehicle or the running state of the host vehicle detected on the basis of the electric signal from the surrounding environment detector portion 2 meets the criterion, the pre-charge permission determination portion 4 outputs an electric signal indicating to the in-cabin warning portion 5 that the pre-charge is being executed, and also outputs an electric signal for causing the brake actuator 6 to execute the pre-charge.

For example, with reference to the infrastructure information obtained from the infrastructure information input device, it is determined whether a certain environment is prone to corner collisions, or whether a certain environment is an environment where a left-turning vehicle is likely to collide with an oncoming vehicle or the like, or whether a certain environment is an environment where a right or left-turning vehicle is likely to collide with a pedestrian on a crosswalk, etc., on the basis of whether a predetermined criterion is met.

Furthermore, with reference to information regarding various roads and road maps obtained from the navigation device, it is determined whether a certain area is an area with high possibility of presence of pedestrians and the like, such as an intersection, a residential area, a highway service area, etc., on the basis of a predetermined criterion. Examples will be described in a case where the needs for warning on an area-by-area basis associated with road maps are stored in the navigation device in the form of digitized values or flag setting. If a digitized value is greater than or equal to a predetermined threshold value or if a flag is on, it is determined that a predetermined criterion is met, so that an electric signal is output to the in-cabin warning portion 5 and the brake actuator 6 so as to execute the pre-charge before the vehicle runs in that area or the like.

Still further, with reference to information regarding various roads and road maps obtained from the navigation device and detection signals from the vehicle speed sensor, it is determined from the present vehicle speed whether there is possibility of the vehicle overrunning a stop line (or a position that requires a stop) or a vicinity thereof, or whether there is possibility of the vehicle overrunning an intersection that is not equipped with a traffic signal or a vicinity of the intersection, etc., on the basis of a predetermined criterion, for example, a braking distance expected from the vehicle speed.

Still further, with reference to information regarding various roads and road maps obtained from the navigation device and detection signals from the vehicle speed sensor and the steering angle sensor, it is determined whether there is possibility of the vehicle turning right or left on the basis of a predetermined criterion. For example, if it is determined that the steering operation performed by the driver is greater than or equal to a predetermined threshold value from the detection signal from the steering angle sensor in a situation where the vehicle starts to run again after verification of a stop of the vehicle at an intersection on the basis of a road map and a detection signal from the vehicle speed sensor, it is assumed that there is possibility of the vehicle turning right or left. Therefore, in this case, too, an electric signal is output to the in-cabin warning portion 5 and the brake actuator 6 so as to execute the pre-charge beforehand.

Although the detection signal from the steering angle sensor is cited above as an example, it is also possible to adopt a construction in which the signal indicating a driver's operation of a blinker or direction indicator is input to the pre-charge permission determination portion 4 and, on the basis of the operation signal, it is determined whether the vehicle is to turn left or right, and accordingly the aforementioned electric signal is output.

Still further, with reference to information regarding various roads and road maps obtained from the navigation device and to information from the image recognition device, it is determined, for example, whether a driver's behavior corresponds to a route of roads that the vehicle is scheduled to follow, on the basis of a predetermined criterion. Examples of the case where such determination is convenient include a case where a driver has been staring rightward for a predetermined time although the vehicle is scheduled to turn left. In this case, too, an electric signal is output to the in-cabin warning portion 5 and the brake actuator 6 so as to execute the pre-charge beforehand.

The in-cabin warning portion 5 is provided for visually or auditorily indicating to the driver that the pre-charge is being executed. The in-cabin warning portion 5 is formed by, for example, a warning indicator lamp provided in an instrument panel in the vehicle cabin, a warning buzzer provided in the vehicle cabin, a voice/sound producing device such as a speaker provided in an audio device or the navigation device, or the like. The indicator lamp is able to visually indicate to the driver that the pre-charge is being executed. The voice producing device is able to auditorily indicate to the driver that the pre-charge is being executed. Specifically, upon input of the aforementioned electric signal from the pre-charge permission determination portion 4, as for example, the in-cabin warning portion 5 indicates the execution of the pre-charge to the driver by lighting on or producing voices or sound.

The brake actuator 6 is formed by a brake mechanism that is capable of automatic pressurization. In other words, the brake actuator 6 is designed to be capable of automatically applying the W/C pressure so as to reduce or eliminate the ineffective stroke, that is, a play stroke that occurs before the friction-applying member, such as a brake pad or the like, is pressed against a friction-receiving member such as a disc rotor or the like.

Figure 2:
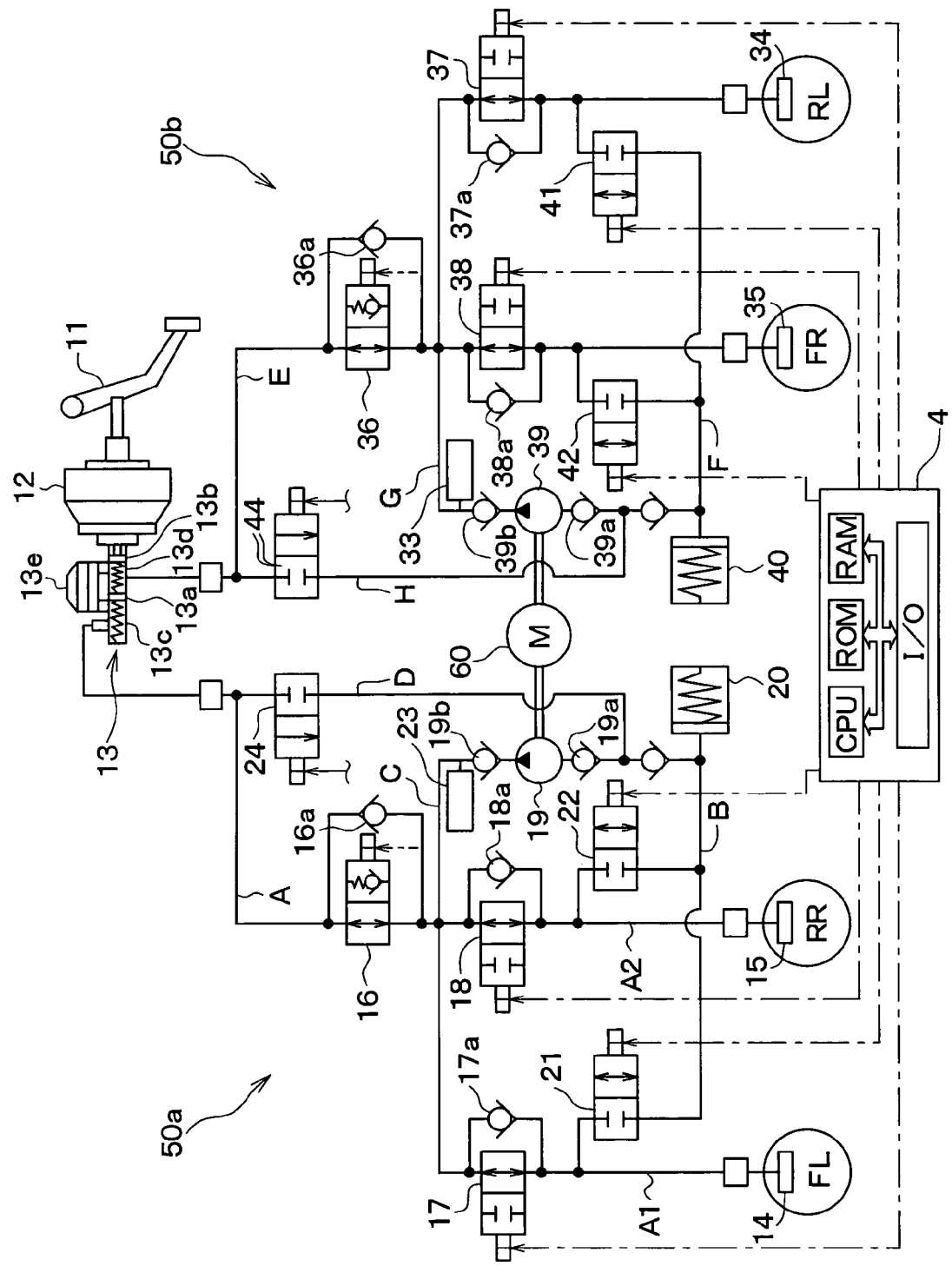
FIG. 2 is a diagram showing an example of the construction of a brake actuator provided in the vehicular brake control apparatus shown in FIG. 1.

FIG. 2 shows an example of the brake actuator 6. As shown in FIG. 2, the brake actuator 6 includes two brake systems (an X-form piping), that is, a first brake system that controls the brake fluid pressure applied to the left front wheel and the right rear wheel, and a second brake system that controls the brake fluid pressure applied to the right front wheel and the left rear wheel.

A brake pedal 11, that is, a brake operating member that is depressed by the driver in order to apply braking force to the vehicle, is connected to a booster device 12 and a master cylinder 13 which are brake fluid pressure sources. When the driver depresses that brake pedal 11, the booster device 12 boosts the depressing force to pressurize the master pistons 13a, 13b disposed in the master cylinder 13. Therefore, the same master cylinder pressure (hereinafter, referred to as "M/C pressure") will be produced in the primary chamber 13c and the secondary chamber 13d that are defined by the master pistons 13a, 13b.

The master cylinder 13 is equipped with a master reservoir 13e having passageways that are connected to the primary chamber 13c and the secondary chamber 13d. Via the passageways, the master reservoir 13e supplies brake fluid into the master cylinder 13, and stores surplus brake fluid from the master cylinder 13. Each of the passageways has a very small diameter as compared with the diameter of main conduits that extend from the primary chamber 13c and the secondary chamber 13d. Therefore, these passageways achieve an orifice effect when the brake fluid flows from the primary chamber 13c and the secondary chamber 13d of the master cylinder 13 into the master reservoir 13e.

The M/C pressure produced in the master cylinder 13 is conducted to the W/Cs 14, 15, 34, 35 through the first brake system 50a and the second brake system 50b.

The brake systems 50a, 50b will be described below. Since the first brake system 50a and the second brake system 50b have substantially the same construction, only the first brake system 50a will be described below. Although the second brake system 50b will not be described, the construction thereof can be understood with reference to the construction of the first brake system 50a.

The first brake system 50a is equipped with a conduit A that is a main conduit that conducts the aforementioned M/C pressure to the W/C 14 provided for the left front wheel FL and the W/C 15 provided for the right rear wheel RR. Via the conduit A, the W/C pressure is produced in each W/C 14, 15.

The conduit A is provided with a first differential pressure control valve 16 that is formed by an electromagnetic valve capable of controlling two positions, that is, an opened state and a differential pressure state. In the first differential pressure control valve 16, an opened state valve position is held during an ordinary braking state. When electric power is supplied to the solenoid coil, the valve position changes to the differential pressure state. While the first differential pressure control valve 16 is at the differential pressure state valve position, the brake fluid is allowed to flow only in the direction from the side of the W/Cs 14, 15 to the side of the master cylinder 13 only when the brake fluid pressure of the pair of W/Cs 14, 15 exceeds the M/C pressure by at least a predetermined value. Therefore, the brake fluid pressure is always controlled so that the W/C 14, 15-side pressure does not exceed the master cylinder 13-side pressure by the predetermined pressure value or more. Conduit protection is thus realized.

The conduit A branches into two conduits A1, A2 at a downstream point on the W/C 14, 15 side of the first differential pressure control valve 16. One of the two conduits A1, A2 is provided with a first pressure increase control valve 17 that controls the increase of the brake fluid pressure supplied to the W/C 14, and the other one is provided with a second pressure increase control valve 18 that controls the increase of the brake fluid pressure supplied to the W/C 15.

The first and second pressure increase control valves 17, 18 are each formed by an electromagnetic valve that is provided as a two-position valve capable of controlling an opened state and a closed state. While the first or second pressure increase control valve 17, 18 is controlled to the opened state, the M/C pressure or the brake fluid pressure produced by discharge of brake fluid from a pump 19 (described below) can be applied to the W/C 14 or 15.

During the ordinary braking achieved by a driver's operation of the brake pedal 11, the first differential pressure control valve 16 and the first and second pressure increase control valves 17, 18 are always controlled to the opened state.

The first differential pressure control valve 16 and the first and second pressure increase control valves 17, 18 are provided with safety valves 16a, 17a, 18a, respectively, which are connected in parallel therewith. The safety valve 16a of the first differential pressure control valve 16 is provided for allowing conduction of the M/C pressure to the W/Cs 14, 15 upon the driver's depression of the brake pedal 11 while the valve position of the first differential pressure control valve 16 is in the differential pressure state. The safety valves 17a, 18a of the pressure increase control valves 17, 18 are provided for allowing reduction of the W/C pressure of the left front wheel FL and the right rear wheel RR corresponding to the driver's release of the brake pedal 11 if the releasing operation is performed while the pressure increase control valves 17, 18 are controlled to the closed state, particularly, during ABS control.

Conduits B connecting the conduits A between the first and second pressure increase control valves 17, 18 and the W/Cs 14, 15 to a reservoir hole of a reservoir 20 are provided with a first pressure reduction control valve 21 and a second pressure reduction control valve 22, respectively. The valves 21, 22 are each formed by an electromagnetic valve that is provided as a two-position valve capable of controlling conduction and closed states. During ordinary braking, the first and second pressure reduction control valves 21, 22 are always controlled to the closed state.

A conduit C connects between the reservoir 20 and the conduit A, that is, a main conduit. The conduit C is provided with a self-priming pump 19 that is actuated by an electric motor 60 so as to suck brake fluid from the reservoir 20 and discharge it toward the side of the master cylinder 13 or the side of the W/Cs 14, 15.

The pump 19 is equipped with safety valves 19a, 19b so as to allow the one-way suction/discharge operation. In order to mitigate the pulsation of the brake fluid discharged by the pump 19, a portion of the conduit C on the discharge side of the pump 19 is provided with a fixed capacity damper 23.

A conduit D is connected to a portion of the conduit C between the reservoir 20 and the pump 19. The conduit D is connected to a primary chamber 13c of the master cylinder 13. The conduit D is provided with a first control valve 24 capable of controlling shut-off and opened states.

During brake assist control, TCS control, ABS control or anti-side-skid control, brake fluid is sucked from the master cylinder 13 through the conduit D by the pump 19 and is discharged therefrom to the conduit A so as to supply brake fluid to a side of the W/C 14, 15 and therefore increase the W/C pressure of object tire wheels.

The construction of the second brake system 50b is substantially the same as that of the first brake system 50a. Specifically, the first differential pressure control valve 16 corresponds to a second differential pressure control valve 36. The first and second pressure increase control valves 17, 18 correspond to third and fourth pressure increase control valves 37, 38, respectively. The first and second pressure reduction control valves 21, 22 correspond to third and fourth pressure reduction control valves 41, 42, respectively. The first control valve 24 corresponds to a first control valve 44. The pump 19 corresponds to a pump 39. The conduits A, B, C and D correspond to conduits E, F, G and H, respectively. The brake actuator 6 is constructed as described above.

In the brake actuator 6 with the configuration as mentioned above, the voltage application control of the control valves 16, 17, 18, 21, 22, 24, 36, 37, 38, 41, 42, 44 and the electric motor 60 for driving the pumps 19, 39 is executed on the basis of the electric signal from the pre-charge permission determination portion 4. In this manner, the control of the W/C pressure generated in the W/Cs 14, 15, 34, 35 is performed.

In the brake actuator 6, each control valve assumes a valve position as indicated in FIG. 2 during normal braking. When M/C pressure is generated in accordance with the amount of depression of the brake pedal 11, the M/C pressure is conducted to the W/Cs 14, 15, 34, 35 so that braking force is generated on each tire wheel.

During traction control, anti-skid control (vehicle stability control) or the like, the first and second differential pressure control valves 16, 36 are controlled to the differential pressure state and the electric motor 60 is energized so as to adjust the braking force on control-object wheels. Therefore, the brake fluid suction/discharge operation of the pumps 19, 39 is performed, so that W/Cs 14, 15, 34, 35 corresponding to control-object wheels are automatically pressurized via the conduits C, G and the conduits A, E to generate braking force.

The pre-charge control processing executed by the vehicular brake control apparatus constructed as described above will be described with reference to the flowchart of the pre-charge control processing shown in FIG. 3. Portions of processing shown in the drawing correspond to devices, units or the like that execute various processings and the like.

Figure 3:
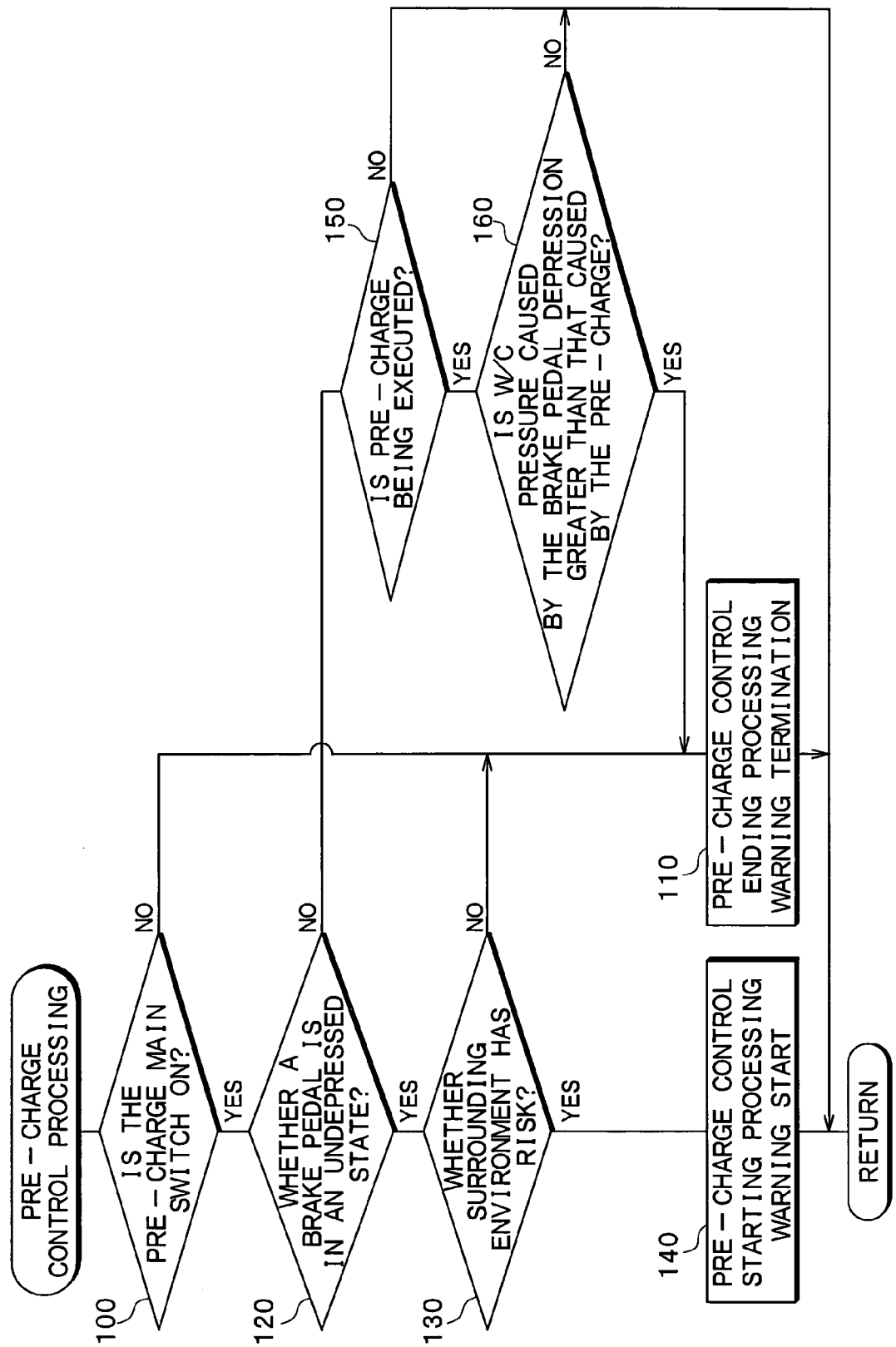
FIG. 3 is a flowchart of a pre-charge control processing executed by the vehicular brake control apparatus shown in FIG. 1.

The vehicular brake control apparatus executes the pre-charge control processing in accordance with the flowchart shown in FIG. 3 when an ignition switch (not shown) provided in the vehicle is turned on. The pre-charge control processing is executed by the pre-charge permission determination portion 4 of the vehicular brake control apparatus in every predetermined control cycle.

At 100, it is determined whether the pre-charge main switch 1 is on, that is, whether the driver has requested the pre-charge control. This determination processing is carried out on the basis of an electric signal input to the pre-charge permission determination portion 4 from the pre-charge main switch 1. Specifically, if the pre-charge main switch 1 is on and an electric signal indicating request for the pre-charge control has been output, the determination is affirmative. If the pre-charge main switch 1 is off and an electric signal indicating the absence of request for the pre-charge control has been output or the electric signal indicating request for the pre-charge control has not been output, the determination is negative.

If the determination is negative, it is considered that the driver has not requested the pre-charge control, the processing proceeds to 110, at which a pre-charge control ending processing is performed. After that, the pre-charge control processing ends. The pre-charge control ending processing is executed if the pre-charge, after being started, is to be ended, or if the pre-charge is not performed. Specifically, in this processing, the driving of the electric motor 60 is stopped in order to end the pre-charge, and the first and second differential pressure control valves 16, 36 are set to the valve position of the opened state as in a normal braking operation. Furthermore, the warning by the in-cabin warning portion 5 is stopped.

Conversely, if the determination is affirmative, it is considered that the driver has requested the pre-charge control, and the processing proceeds to 120.

At 120, it is determined whether the brake pedal 11 is in an undepressed state. This determination processing is performed on the basis of a detection result provided by the brake operation detector portion 3. If the determination is affirmative, the processing proceeds to 130.

At 130, it is determined whether the surrounding environment has risk, specifically, whether the surrounding environment requires execution of the pre-charge so that braking force will be promptly generated. This processing is performed by determining whether information obtained from electric signals input from the surrounding environment detector portion 2 to the pre-charge permission determination portion 4 meets a predetermined criterion as described above.

For example, determination is made regarding contents listed below. The determination regarding the following contents is performed by methods described above.

(1) Whether the surrounding environment is prone to corner collisions, or whether the surrounding environment is an environment where a left-turning vehicle is likely to collide with an oncoming vehicle or the like, or whether the surrounding environment is an environment where a right or left-turning vehicle is likely to collide with a pedestrian on a crosswalk, etc.

(2) Whether the surrounding environment includes an area with high possibility of presence of pedestrians and the like, such as an intersection, a residential area, a highway service area, etc.

Figure 4:
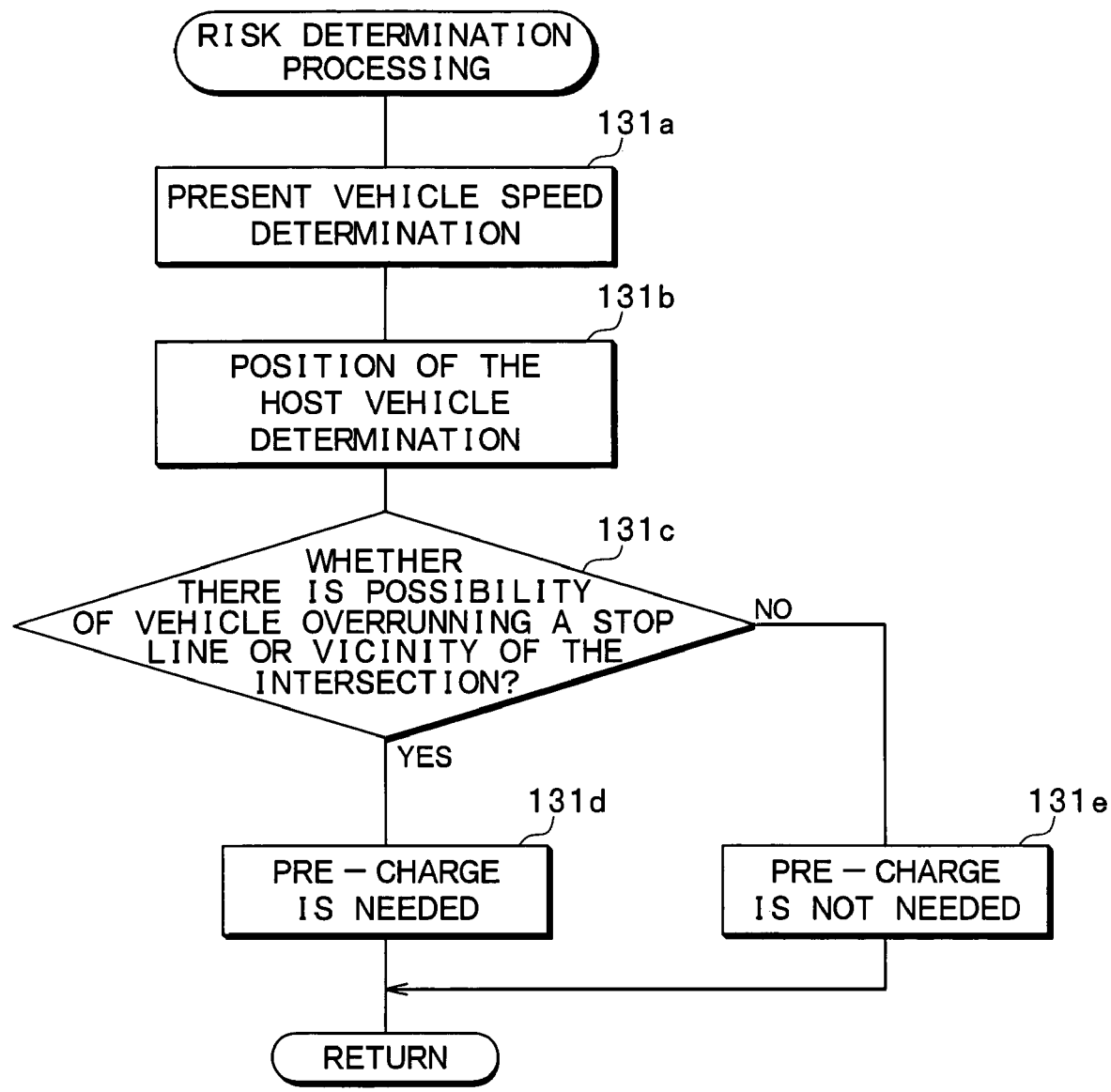
FIG. 4 is a flowchart of an example of the risk determination processing indicated in FIG. 3.

(3) Whether there is possibility of the vehicle overrunning a stop line or a vicinity thereof, or whether there is possibility of the vehicle overrunning an intersection that is not equipped with a traffic signal or a vicinity of the intersection, etc. The content of the processing in this case is illustrated in the flowchart of FIG. 4.

Firstly at 131a, a present vehicle speed is computed on the basis of a detection signal input from the vehicle speed sensor. Subsequently at 131b, the position of the host vehicle is detected on the basis of the input of the navigation device. Then at 131c, it is determined from information regarding various roads and road maps obtained from the navigation device whether there is possibility of the vehicle overrunning a stop line or a vicinity thereof or an intersection that is not equipped with a traffic signal or a vicinity of the intersection. This determination processing is performed, for example, on the basis of whether the distance to the stop line or the intersection without a traffic signal is less than the braking distance expected from the vehicle speed.

If the determination at 131c is affirmative, the processing proceeds to 131d, at which a flag indicating that there is a need for the pre-charge is set. Conversely, if the determination at 131c is negative, the processing proceeds to 131e, at which the flag indicating that there is a need for the pre-charge is cleared. In this manner, the determination as to whether there is any risk as indicated in FIG. 3 is performed. The determination at 130 is performed on the basis of the state of the flag mentioned above.

Figure 5:
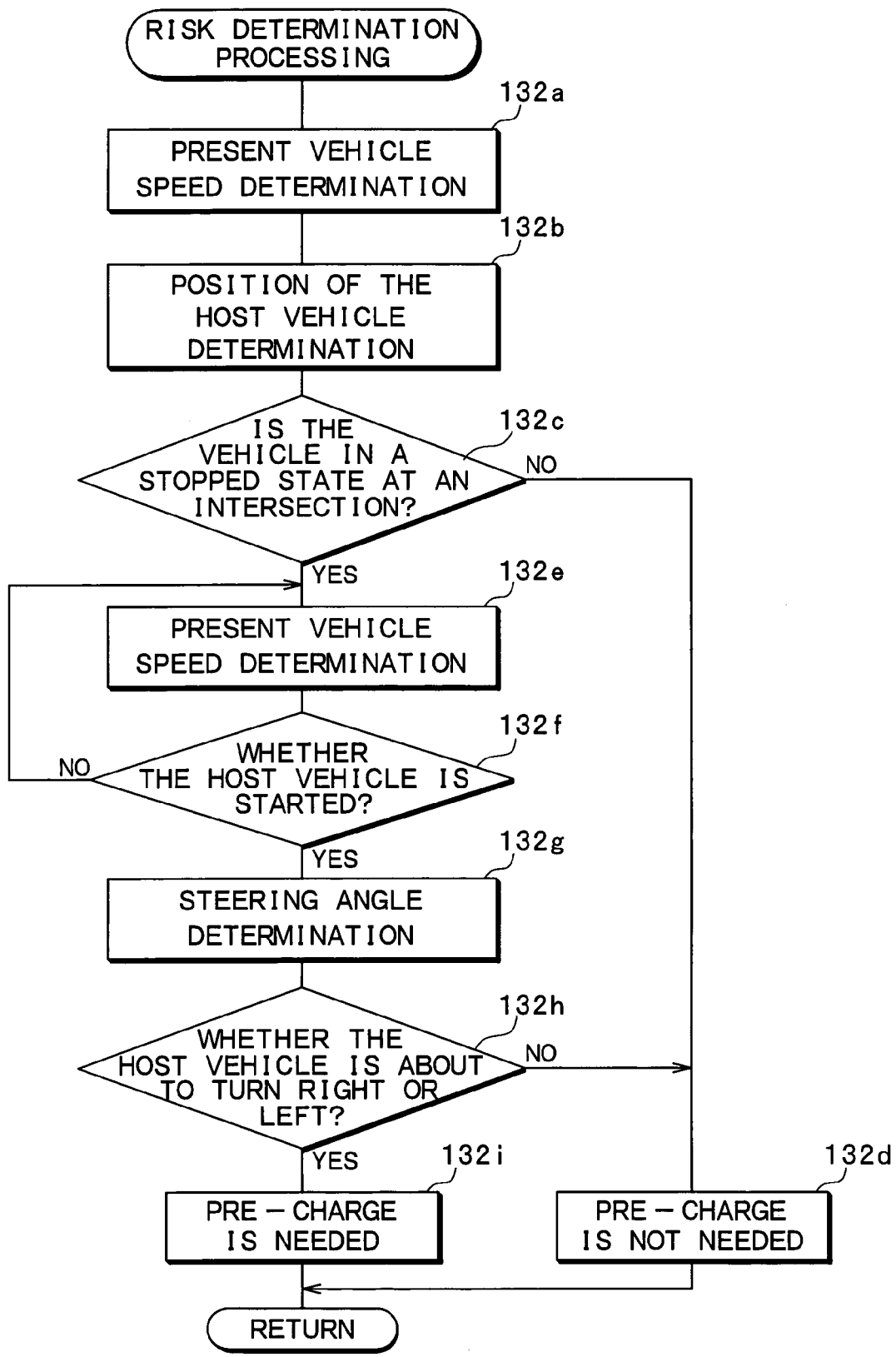
FIG. 5 is a flowchart of another example of the risk determination processing indicated in FIG. 3.

(4) Whether there is possibility of the vehicle turning right or left. The content of the processing in this case is illustrated in the flowchart of FIG. 5.

Firstly at 132a and 132b, a processing similar to the processing executed at 131a and 131b shown in FIG. 4 is executed. Subsequently at 132c, it is determined whether the vehicle is in a stopped state at an intersection from information regarding various roads and road maps obtained from the navigation device and the determined vehicle speed.

If the determination at 132c is negative, there is no need for warning, and therefore the flag indicating that there is a need for the pre-charge is cleared at 132d. Conversely, if the determination at 132c is affirmative, the processing proceeds to 132e, at which the vehicle speed is computed again on the basis of the detection signal from the vehicle speed sensor. Subsequently at 132f, it is determined whether the host vehicle has started from the re-determined vehicle speed. If it is determined at 132f that the host vehicle has not started, the processing at 132e and 132f is repeated until the host vehicle starts. If it is determined that the host vehicle has started, the processing proceeds to 132g.

At 132g, the output signal of the steering angle sensor is input. Subsequently at 132h, it is determined whether the host vehicle is about to turn right or left. This determination processing is performed on the basis of whether the steering angle determined from the output signal of the steering angle sensor input at 132g is greater than a predetermined threshold value. If the determination at 132h is affirmative, the processing proceeds to 132i, at which the flag indicating that there is a need for the pre-charge is set. If the determination is negative, the processing proceeds to 132d, at which the flag indicating that there is a need for the pre-charge is cleared. In this manner, the determination as to whether there is any risk as indicated in FIG. 3 is executed. The determination at 130 is executed on the basis of the state of the flag mentioned above.

Figure 6:
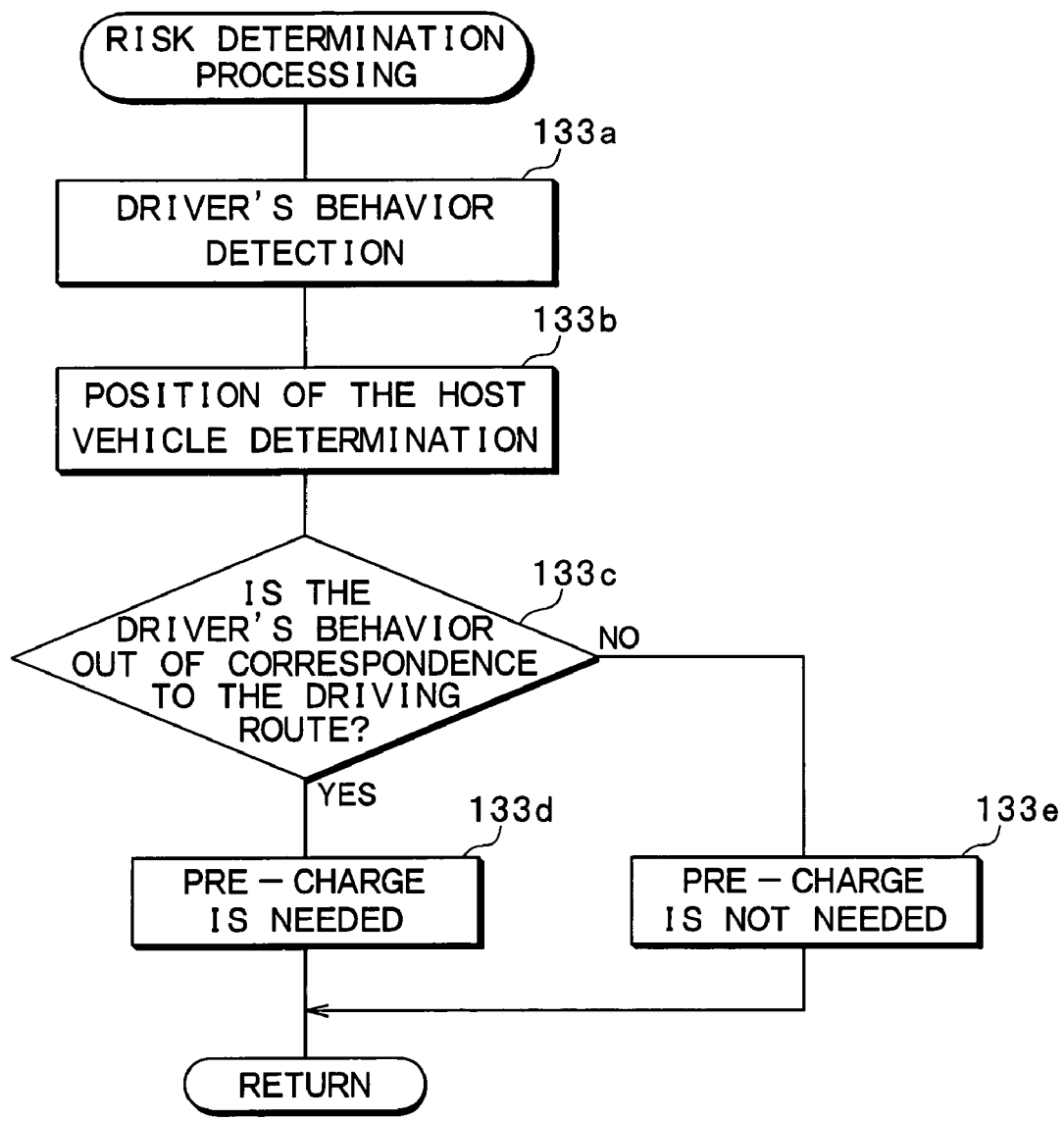
FIG. 6 is a flowchart of still another example of the risk determination processing indicated in FIG. 3.

(5) Whether the driver's behavior corresponds to a route of roads that the vehicle is scheduled to follow. The content of the processing in this case is illustrated in the flowchart of FIG. 6.

Firstly at 133a, the driver's behavior detected by the image recognition device is input. Subsequently at 133b, a processing similar to the processing executed at 131b is executed.

Subsequently at 133c, it is determined whether the driver's behavior is out of correspondence to or corresponds to the driving route. This determination processing is performed on the basis of a criterion, for example, whether the driver has been staring rightward for at least a predetermined time although the vehicle is scheduled to turn left.

If it is determined at 133c that the driver's behavior is out of correspondence to the driving route, the processing proceeds to 133d, at which the flag indicating that there is a need for the pre-charge is set. If it is determined that the driver's behavior is not out of correspondence to (i.e., corresponds to) the driving route, the processing proceeds to 133e, at which the flag indicating that there is a need for the pre-charge is cleared. In this manner the determination as to whether there is any risk as indicated in FIG. 3 is performed. The determination at 130 is performed on the basis of the state of the flag mentioned above.

If the result of determination obtained by the processing at 130 executed as described above is that there is a need for the pre-charge, the processing proceeds to 140. If the result of determination is that there is no need for the pre-charge, the processing proceeds to 110, at which the pre-charge control ending processing is executed as described above.

At 140, a pre-charge control starting processing is executed, that is, an electric signal for executing the pre-charge is output to the brake actuator 6 and an electric signal indicating that the pre-charge is being executed is output to the in-cabin warning portion 5.

Therefore, in the brake actuator 6, the electric motor 60 is driven to cause the pumps 19, 39 to perform the brake fluid suction/discharge operation, and the first and second differential pressure control valves 16, 36 are set to the differential pressure state. Therefore, via the primary chamber 13c and the secondary chamber 13d of the M/C 13, the pumps 19, 39 suck and discharge brake fluid so that the W/Cs 14, 15, 34, 35 are pressurized, that is, pre-charged, via the conduits C, G and the conduits A, E.

The W/C pressure generated in the W/Cs 14, 15, 34, 35 reduces or eliminates the ineffective stroke between the friction-applying member and the friction-receiving object. Specifically, if the brake actuator 6 is of a type that incorporates disc brakes for generating braking force, the ineffective stroke between the brake pad and the disc rotor in each brake caliper is reduced or eliminated. If the brake actuator 6 is of a type that incorporates drum brakes for generating braking force, the ineffective stroke between the brake shoe and the drum internal wall surface in each brake drum is reduced or eliminated.

Furthermore, the in-cabin warning portion 5 produces a warning in the form of visual indication of a lamp or the like or in the form of voices or sounds, so as to indicate to the driver that the pre-charge is being executed.

Therefore, it becomes possible for the driver to recognize that the pre-charge is being executed. Furthermore, since the ineffective stroke between the friction-applying member and the friction-receiving object has been reduced or eliminated, braking force can be promptly generated on the vehicle when the driver depresses the brake pedal in accordance with the need.

Still further, if the processing proceeds to 140, it is indicated that the pre-charge has been started and is being executed by, for example, a flag set during the pre-charge, or the like.

If the determination at 120 is negative, the processing proceeds to 150, at which it is determined whether the pre-charge is being executed. This determination is performed on the basis of whether the aforementioned under-the-pre-charge flag has been set. That is, it is determined whether the depression of the brake pedal was performed during the pre-charge. If the pre-charge is being executed and the brake pedal is in the depressed state, it must be determined which one of the W/C pressure generated by the pre-charge and the W/C pressure generated by the depression of the brake pedal is to be given priority.

Hence, at 150, it is determined whether the pre-charge is being executed. If the pre-charge is not being executed, the pre-charge control processing is immediately ended. In this case, since the pre-charge has not been executed, a W/C pressure corresponding to the depression of the brake pedal is generated.

If it is determined at 150 that the pre-charge is being executed, the processing proceeds to 160, at which it is determined whether the W/C pressure caused by the depression of the brake pedal is greater than the W/C pressure caused by the pre-charge. If the W/C pressure caused by the depression of the brake pedal is greater than the W/C pressure caused by the pre-charge, it is considered that the need for the pre-charge no longer exists. Then, the processing proceeds to 110, at which the pre-charge control ending processing is executed. Therefore, the W/C pressure corresponding to the depression of the brake pedal is generated.

Conversely, if the W/C pressure caused by the depression of the brake pedal is less than the W/C pressure caused by the pre-charge, it is considered that the need for the pre-charge still exists, and the pre-charge control processing is ended without a stop of the pre-charge. Therefore, if the driver only slightly depresses the brake pedal 11 during the pre-charge, the pre-charge is not ended. Since the pre-charge is continued in this case, braking force can be promptly generated on the vehicle when the driver depresses the brake pedal 11 in accordance with the need.

As can be understood from the foregoing description, the vehicular brake control apparatus of this embodiment detects risky occasions and locations that may be risky and, for such locations and the like, performs the pre-charge so that braking force will be promptly generated. Therefore, the pre-charge can be precisely performed under necessary circumstances, irrespectively of the driver's accelerator operation. Hence, when the driver depresses the brake pedal at such a location or the like, braking force will be promptly generated. Thus, accidents and the like can be prevented.

If a navigation device or an infrastructure information input device is used as a surrounding environment detector portion 2, it becomes possible to perform the pre-charge in advance also for locations that cannot be detected by the various sensors mounted on the vehicle for detecting ambient environments. Therefore, this arrangement makes it possible to effectively perform the pre-charge not only when it is risky but also when it may be risky, and thus contributes to prevention of accidents and the like.

Furthermore, since the vehicular brake control apparatus of this embodiment performs the pre-charge in accordance with ambient environments, unnecessarily frequent performance of the pre-charge is avoided, that is, the pre-charge is not performed when it is not needed, but is performed only when it is truly needed, for example, at emergency occasions and the like. Therefore, it becomes possible to avoid discomforting the driver about brake feeling.

Even in a situation where the vehicle starts running again after a temporary stop, the pre-charge will be performed if it is determined from the surrounding environment that the pre-charge is needed. Therefore, in such a case, too, braking force can be promptly generated on the vehicle.

First Modification of First Embodiment

Although in the foregoing first embodiment, the determination regarding risk is performed at 130 in FIG. 3, conceivable examples of the determination regarding risk further exist besides the examples indicated in FIGS. 4 to 6. Such an example will be described as a first modification of the first embodiment. In terms of the overall construction of the vehicular brake control apparatus as shown in the block diagram of FIG. 1, this modification is substantially the same as the first embodiment. This modification differs merely in the processing executed by the pre-charge permission determination portion 4, and only different features will be described below.

Figure 7:
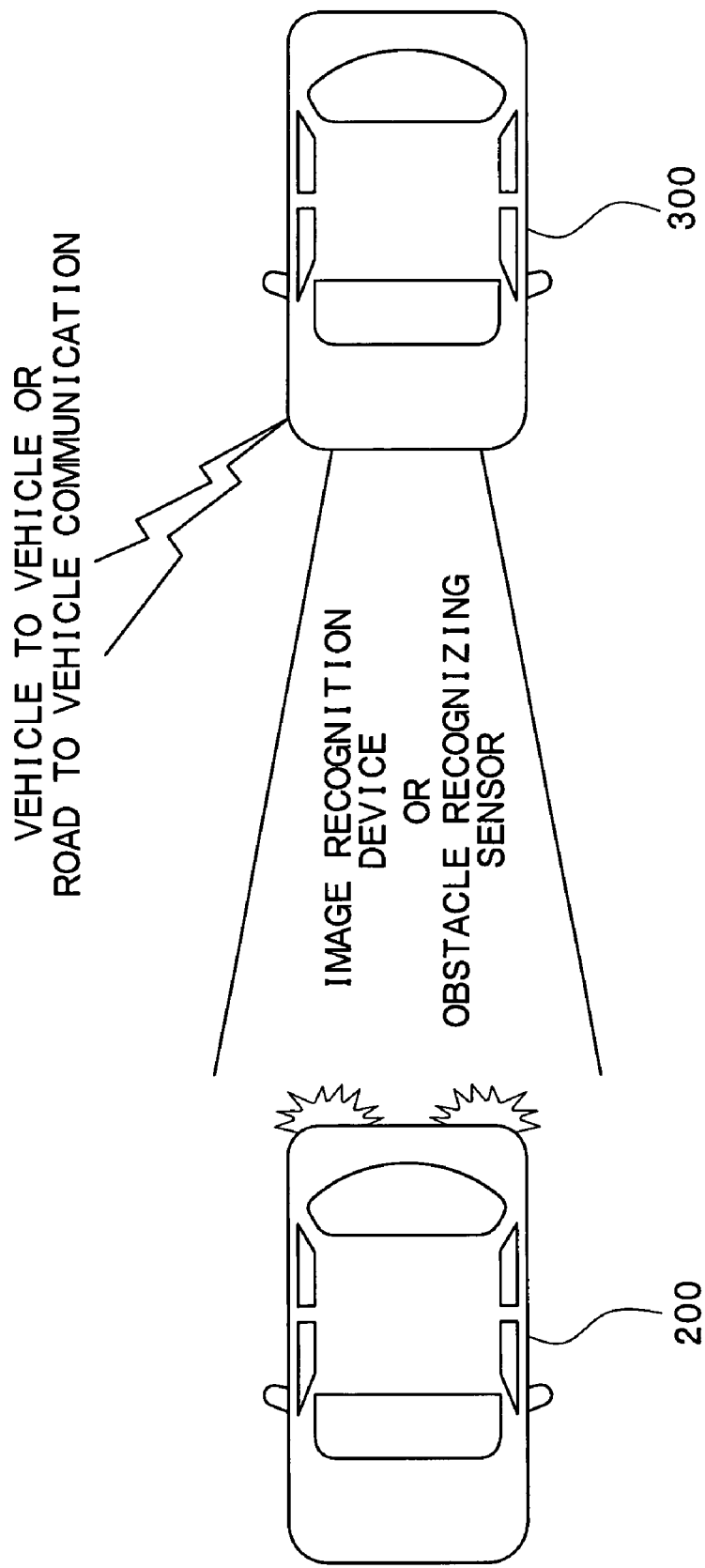
FIG. 7 is a schematic diagram illustrating a case where, during a run of a host vehicle, there is a preceding vehicle.

In this modification, the vehicular brake control apparatus detects performance of a braking operation of a preceding vehicle, and correspondingly performs the pre-charge. As indicated in the schematic diagram of FIG. 7 showing running vehicles, if a braking operation of a preceding vehicle 200 occurs, the deceleration of the preceding vehicle 200 may possibly result in a rapid approach of the preceding vehicle 200 to a host vehicle 300. Such a case is considered risky so that the pre-charge is performed.

Figure 8:
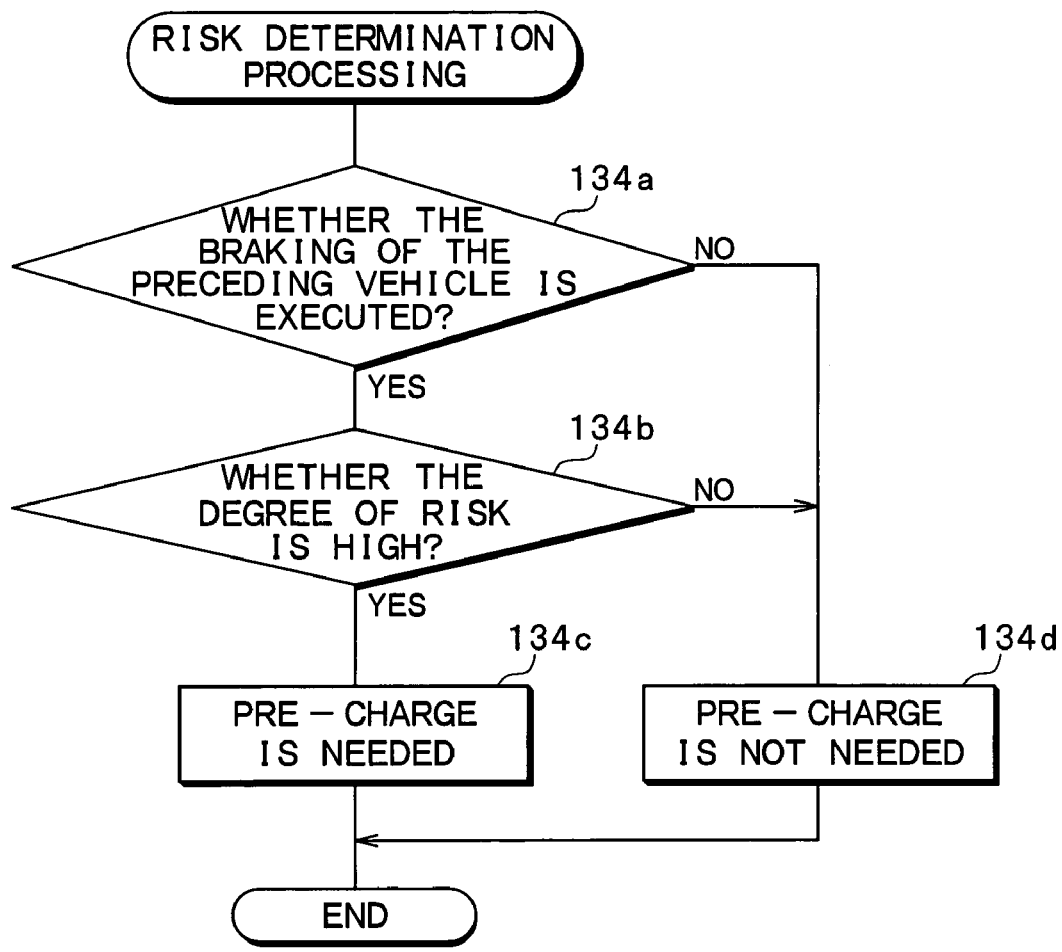
FIG. 8 is a flowchart of a risk determination processing in accordance with a first modification of the first embodiment.

FIG. 8 is a flowchart of a risk determination processing executed by the pre-charge permission determination portion 4 in this modification.

At 134a, a processing of determining the braking of the preceding vehicle 200 is executed. Specifically, it is determined from information obtained from the surrounding environment detector portion 2 whether a braking operation of the preceding vehicle 200 has occurred. More specifically, since the surrounding environment detector portion 2 is formed by an infrastructure information input device, an image recognition device or the like as mentioned above, the surrounding environment detector portion 2 is able to detect the state of the brake lamps of the preceding vehicle 200 or acquire information regarding the braking operation of the preceding vehicle 200. Thus, the state of the preceding vehicle 200 is considered an element of the surrounding environment. If the image recognition device of the surrounding environment detector portion 2 detects the turning-on of the brake lamps of the preceding vehicle 200, or if the infrastructure information input device of the surrounding environment detector portion 2 receives information indicating that a braking operation of the preceding vehicle 200 has been performed via the vehicle-to-vehicle communication or the road-to-vehicle communication, it is determined that the braking of the preceding vehicle 200 has occurred, that is, the determination at 134a is affirmative.

Subsequently at 134b, determination regarding the degree of risk is executed. For example, it is determined whether the inter-vehicle distance between the preceding vehicle 200 and the host vehicle 300 is less than a predetermined value (first predetermined value) N1 and the relative speed between the preceding vehicle 200 and the host vehicle 300 is greater than a predetermined value (second predetermined value) A1. The inter-vehicle distance and the relative speed between the preceding vehicle 200 and the host vehicle 300 can be acquired via the surrounding environment detector portion 2 since the surrounding environment detector portion 2 includes an obstacle recognizing sensor and the like.

The predetermined value N1 and the predetermined value A1 are set at values that minimize or avoid the change in the driver's brake feeling. That is, the values are set so as to avoid the pre-charge in the cases where the inter-vehicle distance is so great that there is substantially no degree of risk and avoid the pre-charge in the cases where the relative speed of the host vehicle 300 with respect to the preceding vehicle 200 is substantially zero or negative and therefore there is substantially no possibility of the host vehicle 300 catching up with the preceding vehicle 200.

If an affirmative determination is made at both 134a and 134b, the processing proceeds to 134c, at which a flag indicating that there is a need for the pre-charge is set. If a negative determination is made at 134a or 134b, the processing proceeds to 134d, at which the flag indicating that there is a need for the pre-charge is cleared.

Thus, performing the pre-charge upon occurrence of the braking operation of the preceding vehicle 200 makes it possible to generate braking force in a quick response if the preceding vehicle 200 slows down and comes closer to the host vehicle 300. Furthermore, instead of performing the pre-charge in all the cases where the braking operation of the preceding vehicle 200 occurs, the vehicular brake control apparatus of this modification performs the pre-charge only when a condition as indicated at 134b is met. This arrangement achieves a restriction such that the pre-charge is not performed unnecessary, and therefore improves the precision of the pre-charge.

Second Modification of First Embodiment

Another example of the determination regarding risk described above in conjunction with the first embodiment and shown at 130 in FIG. 3 will be described as a second modification of the first embodiment. In terms of the overall construction of the vehicular brake control apparatus as shown in the block diagram of FIG. 1, this modification is substantially the same as the foregoing first embodiment. This modification differs merely in the processing executed by the pre-charge permission determination portion 4, and only different features will be described below.

Figure 9:
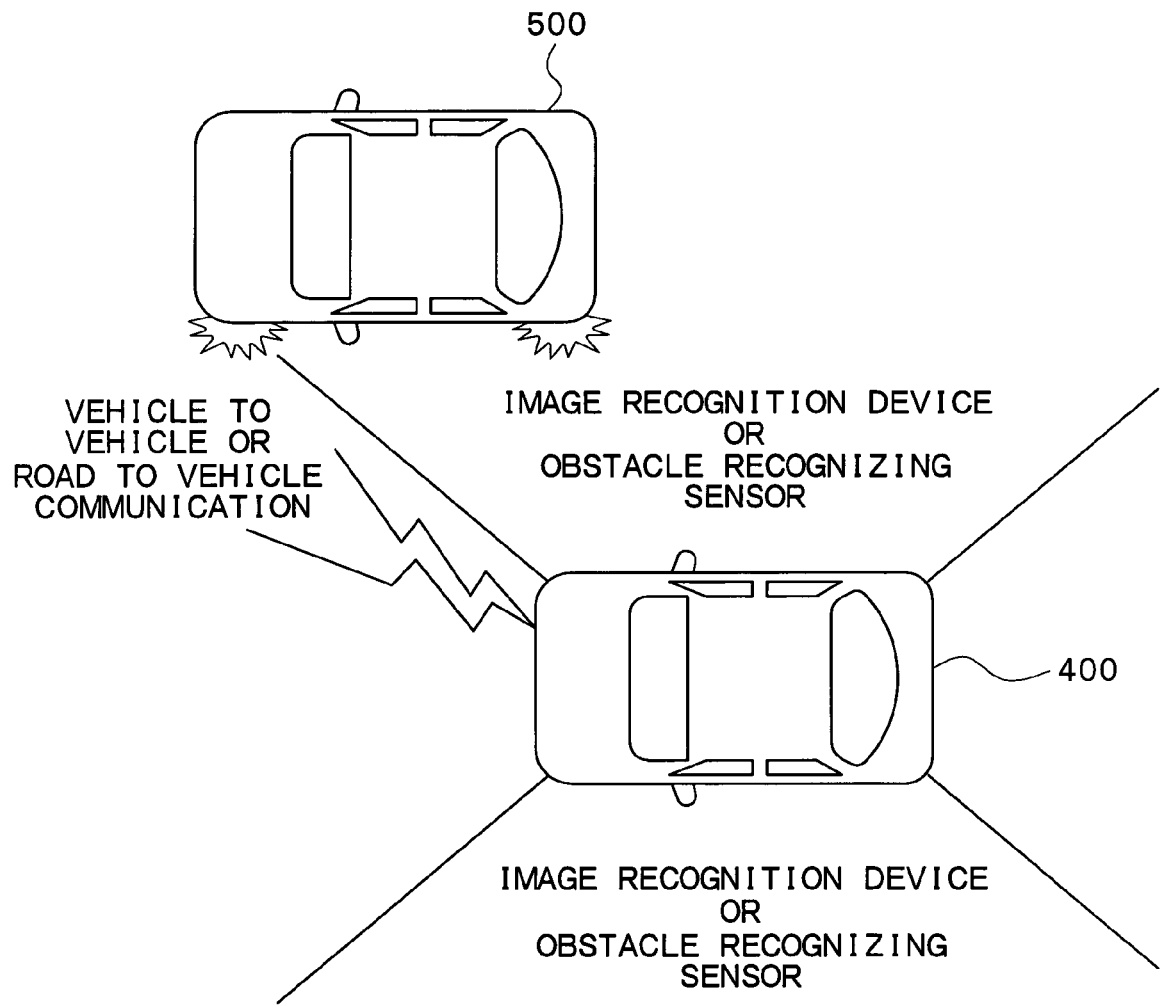
FIG. 9 is a schematic diagram illustrating a case where, during a run of a host vehicle, there is a cut-in vehicle.

In this modification, the vehicular brake control apparatus detects a vehicle cutting in front of the host vehicle, and correspondingly performs the pre-charge. That is, a situation where a vehicle 500 is about to cut in front of a host vehicle 400 as indicated by a schematic diagram of two running vehicles in FIG. 9 is considered risky. In such a situation, the pre-charge is executed.

Figure 10:
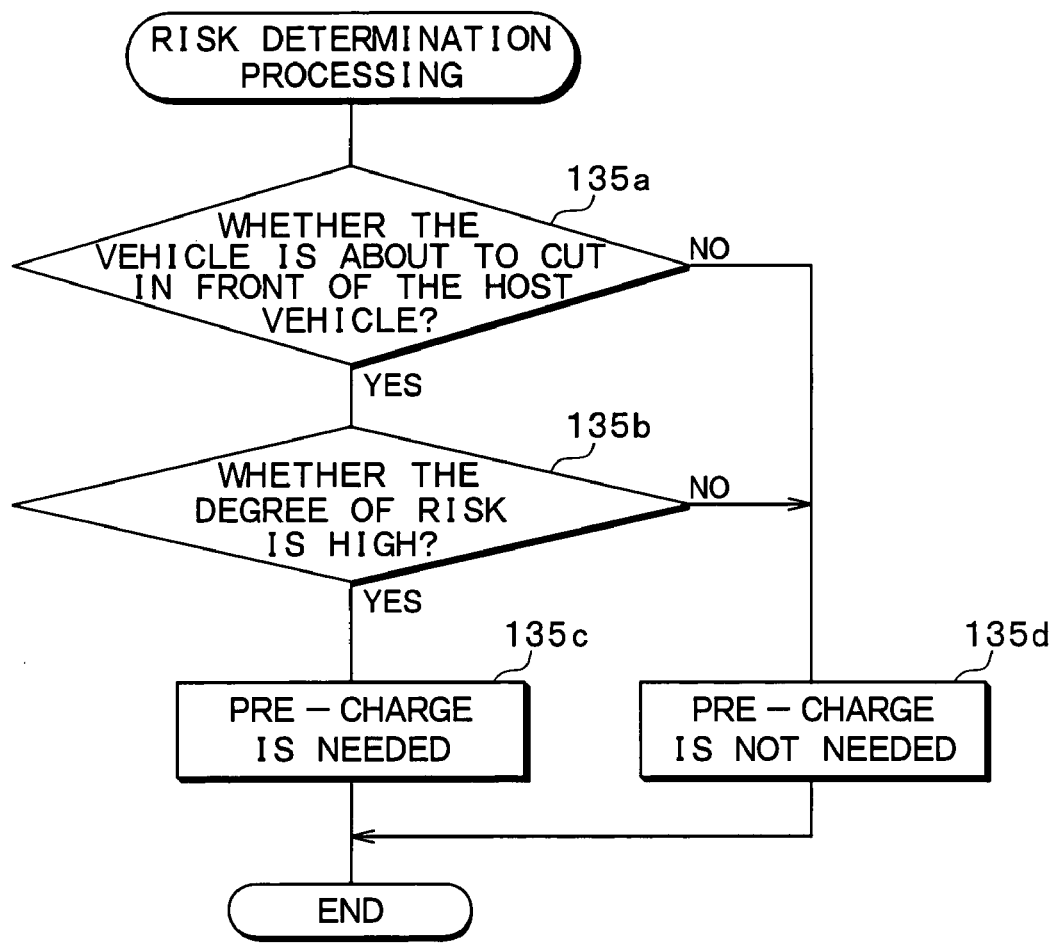
FIG. 10 is a flowchart of a risk determination processing in accordance with a second modification of the first embodiment.

FIG. 10 is a flowchart of a risk determination processing executed by the pre-charge permission determination portion 4 in this modification.

At 135a, a cut-in determination processing of determining whether a vehicle is about to cut in front of the host vehicle 400 is executed. Specifically, it is determined from information obtained from the surrounding environment detector portion 2 whether the present situation is a situation where a vehicle 500 existing at a side of the host vehicle 400 (hereinafter, simply referred to as "laterally adjacent vehicle 500") is about to cut in front of the host vehicle 400. More specifically, since the surrounding environment detector portion 2 is formed by an infrastructure information input device or an image recognition device or the like as mentioned above, the surrounding environment detector portion 2 is able to detect the state of the direction indicator of the laterally adjacent vehicle 500 or acquire information regarding the steering of the laterally adjacent vehicle 500. Thus, the state of the laterally adjacent vehicle 500 is considered an element of the surrounding environment. If the image recognition device of the surrounding environment detector portion 2 detects the flashing of the direction indicator of the laterally adjacent vehicle 500, or if the infrastructure information input device of the surrounding environment detector portion 2 obtains information regarding the steering of the laterally adjacent vehicle 500 via the vehicle-to-vehicle communication or the road-to-vehicle communication and detects, from the steering information, that the laterally adjacent vehicle 500 is moving into an area forward of the host vehicle 400, it is determined that laterally adjacent vehicle 500 is about cut in, that is, the determination at 135a is affirmative.

Subsequently at 135b, determination regarding the degree of risk is executed. For example, it is determined whether the inter-vehicle distance between the laterally adjacent vehicle 500 and the host vehicle 400 acquired via the surrounding environment detector portion 2 is less than a predetermined value (third predetermined value) N2 and the relative speed between the laterally adjacent vehicle 500 and the host vehicle 400 is greater than a predetermined value (fourth predetermined value) A2.

The predetermined value N2 and the predetermined value A2 are set at values that minimize or avoid the change in the driver's brake feeling. That is, the values are set so as to avoid the pre-charge in the cases where the inter-vehicle distance is so great that there is substantially no degree of risk and avoid the pre-charge in the cases where the relative speed of the host vehicle 400 with respect to the laterally adjacent vehicle 500 is substantially zero or negative and therefore there is substantially no possibility of the host vehicle 400 catching up with the vehicle 500, if the vehicle 500 cuts in front of the host vehicle 400.

Furthermore, the running path of the laterally adjacent vehicle 500 is determined on the basis of the information regarding the steering angle acquired by the surrounding environment detector portion 2 via the vehicle-to-vehicle communication. In this case, it is possible to perform the pre-charge only when the running path of the host vehicle 400 does not have a good clearance from the running path of the laterally adjacent vehicle 500.

If an affirmative determination is made at both 135a and 135b, the processing proceeds to 135c, at which a flag indicating that there is a need for the pre-charge is set. If a negative determination is made at 135a or 135b, the processing proceeds to 135d, at which the flag indicating that there is a need for the pre-charge is cleared.

Thus, if the pre-charge is performed in a situation where the laterally adjacent vehicle 500 is about to cut in front of the host vehicle 400, braking force can be correspondingly quickly generated. Furthermore, instead of executing the pre-charge in all the cases where the cut-in of the laterally adjacent vehicle 500 occurs, the vehicular brake control apparatus of this modification executes the pre-charge only when a condition as indicated at 135b is met. This arrangement achieves a restriction such that the pre-charge is not performed unnecessary, and therefore improves the precision of the pre-charge.

Second Embodiment

A second embodiment of the present invention will be described. This embodiment is different from the first embodiment in that the amount of brake fluid used for the pre-charge is varied between the front and rear wheels. In terms of the overall construction of the vehicular brake control apparatus as shown in the block diagram of FIG. 1 and the like, the second embodiment is substantially the same as the first embodiment. Only different features of the second embodiment will be described below.

Figure 11:
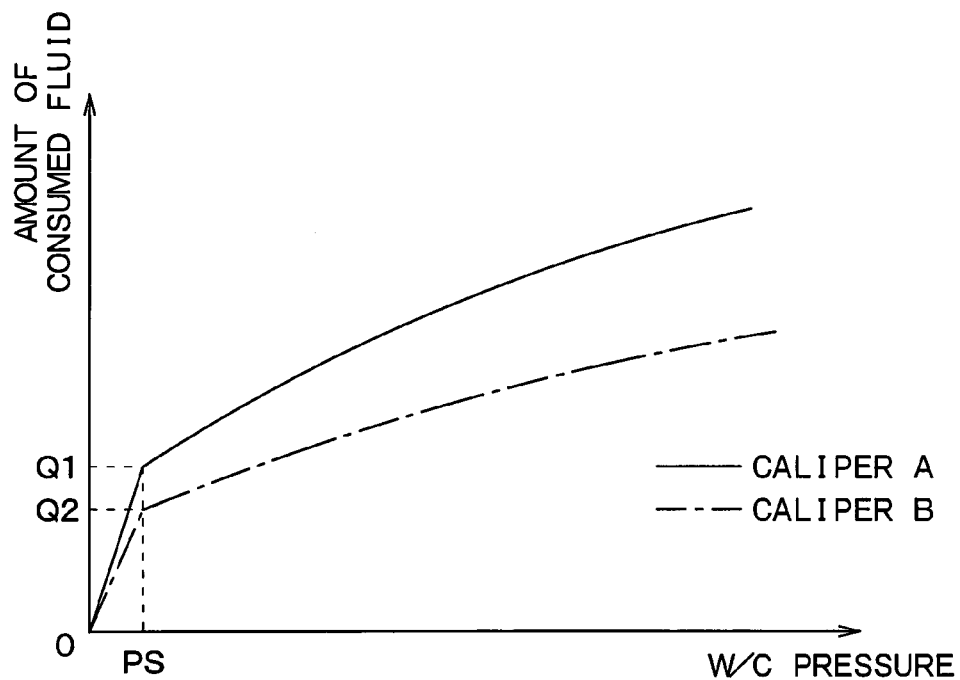
FIG. 11 is a correlation diagram indicating a relationship between the amount of brake fluid consumed (hereinafter, referred to as "amount of consumed fluid") by a brake caliper A provided for a front wheel and the W/C pressure and a relationship between the amount of brake fluid consumed by a brake caliper B provided for a rear wheel and the W/C pressure.

FIG. 11 is a correlation diagram indicating a relationship between the amount of brake fluid consumed (hereinafter, referred to as "amount of consumed fluid") by a brake caliper A provided for a front wheel and the W/C pressure and a relationship between the amount of consumed fluid by a brake caliper B provided for a rear wheel and the W/C pressure.

In general, the brake caliper A provided for each front wheel and the brake caliper B provided for each rear wheel have different specifications. Therefore, as indicated in FIG. 11, the amounts of consumed fluid Q1, Q2 of the front and rear wheels are different even if equal W/C pressures PS are to be generated on the front wheel and the rear wheel. Specifically, since the front wheel brake caliper A is usually designed with a greater capacity than the rear wheel brake caliper B, a greater amount of consumed fluid is needed for the front wheel than for the rear wheel in order to generate a fixed W/C pressure PS. Therefore, in this embodiment, the amount of consumed fluid is varied between the front and rear wheels.

Figure 12:
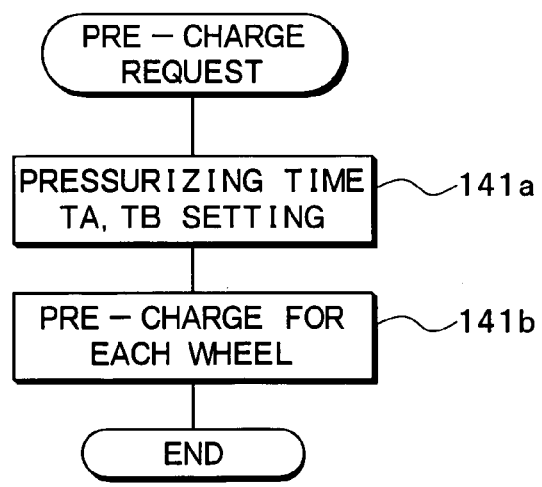
FIG. 12 is a flowchart of an amount-of-flow setting processing of setting the amounts of consumed fluid of front and rear wheels.

FIG. 12 is a flowchart of an amount-of-flow setting processing of setting the amounts of consumed fluid of the front and rear wheels. This processing is executed when there is a pre-charge request, that is, in the pre-charge control starting processing at 140 in FIG. 3 described above in conjunction with the first embodiment.

Firstly at 141a, a pressurization time setting processing is executed. In this processing, a length of time TA for supplying brake fluid to pressurize the W/C 14, 35 corresponding to the front wheels and a length of time TB for supplying brake fluid to pressurize the W/C 15, 34 corresponding to the rear wheels are set. Each of the time TA and the time TB corresponds to the time for supplying the amount of consumed fluid Q1 or Q2 needed in order to generate the W/C pressure PS of the pre-charge indicated in FIG. 11 for the W/Cs 14, 15, 34, 35 of the front or rear wheels.

Subsequently at 141b, the pre-charge is executed for all the tire wheels. Specifically, pressurization is performed on the brake calipers A of the W/Cs 14, 35 of the front wheels for the time TA, and pressurization is performed on the brake calipers B of the W/Cs 15, 34 of the rear wheels for the time TB. After that, the W/C pressure of each tire wheel is maintained.

In this manner, the amount of consumed fluid needed for the pre-charge is varied among the brake calipers, that is, the amounts of consumed fluid appropriate to the individual brake calipers are set, so as to allow execution of more suitable pre-charge.

First Modification of Second Embodiment

Figure 13:
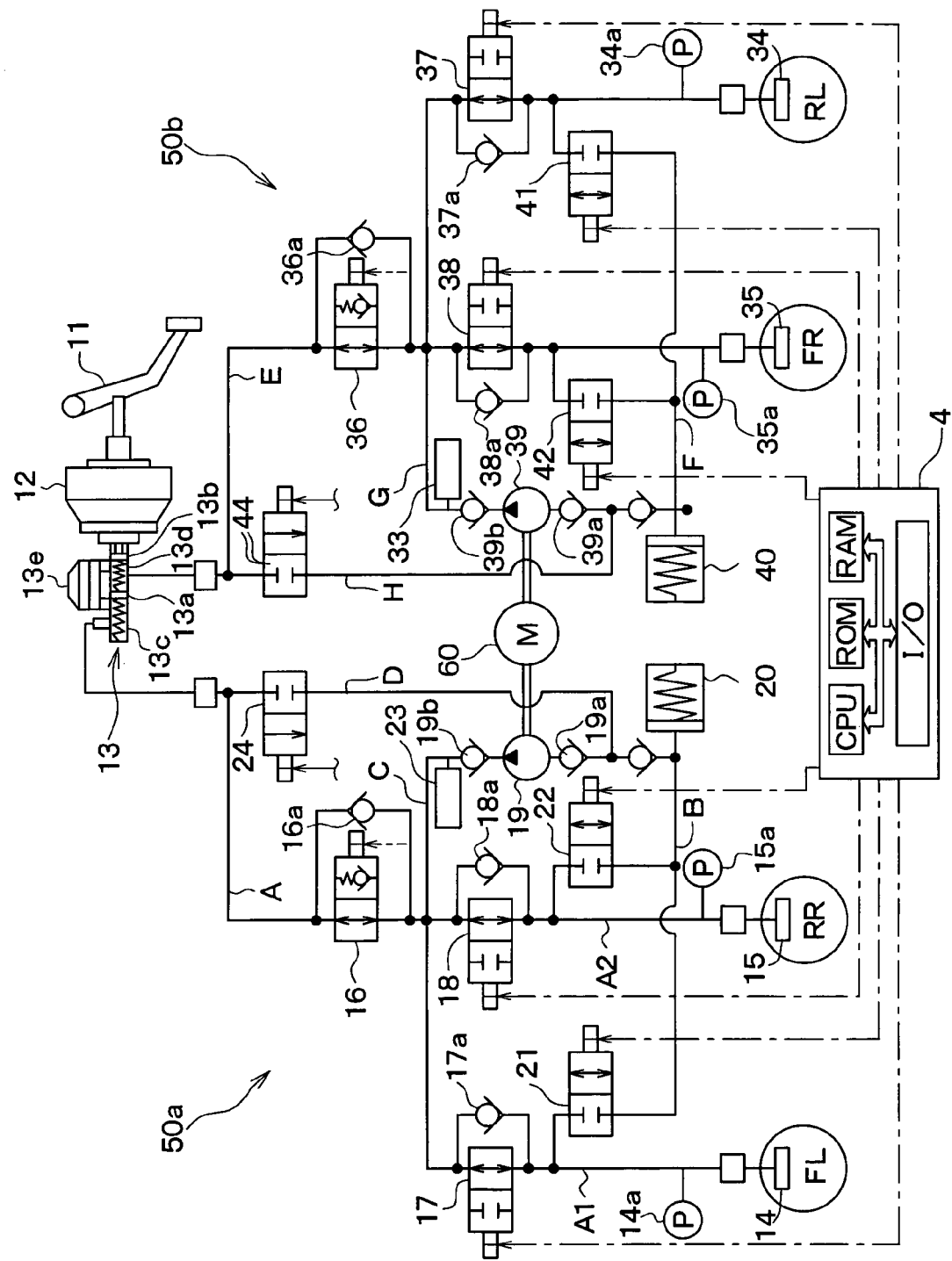
FIG. 13 is a block diagram illustrating a construction of a vehicular brake control apparatus in accordance with a first modification of a second embodiment of the present invention.

In the foregoing second embodiment, the amounts of consumed fluid appropriate to the brake calipers are set so that the amount of consumed fluid needed for the pre-charge is variable among the brake calipers, and the calipers are pressurized for the lengths of time TA, TB corresponding to the set amounts of consumed fluid so that each W/C pressure reaches the set value PS. Other methods are also possible. For example, direct detection of the W/C pressure of each brake caliper also makes it possible to bring each W/C pressure to the set value PS. That is, as shown in FIG. 13, pressure sensors 14a, 15a, 34a, 35a are provided corresponding to the W/Cs 14, 15, 34, 35 of the brake actuator 6 of the vehicular brake control apparatus shown in FIG. 2. Each W/C pressure is detected by a corresponding one of the pressure sensors, and is brought to a desired set value PS.

Figure 14:
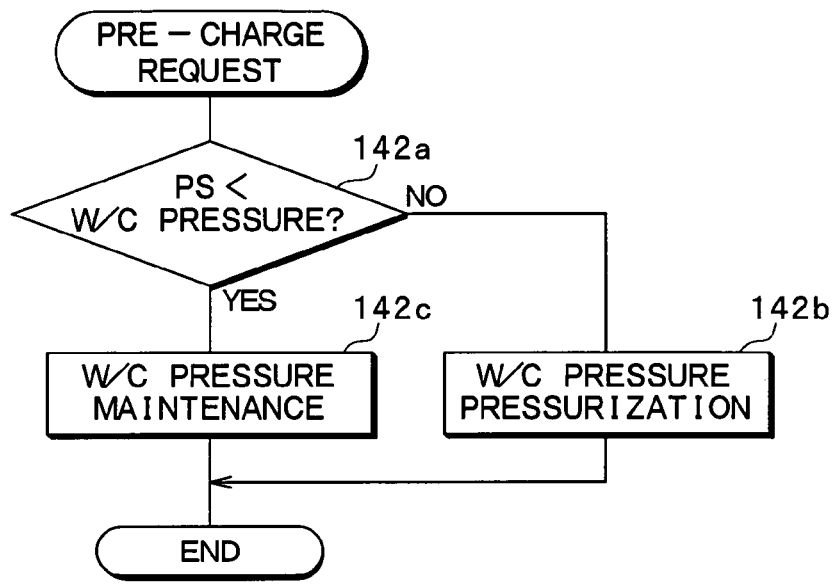
FIG. 14 is a flowchart of a W/C pressure control processing in the first modification of the second embodiment.

FIG. 14 is a flowchart of a W/C pressure control processing in this modification. As in the foregoing second embodiment, this processing is executed when there is a pre-charge request, that is, in the pre-charge control starting processing at 140 in FIG. 3 described above in conjunction with the first embodiment. This processing is executed for each wheel.

Firstly at 142a, it is determined whether the W/C pressure detected by a pressure sensor 14a, 15a, 34a or 35a has become equal to or greater than the set pressure PS. If the determination at 142a is negative, the processing proceeds to 142b, at which the W/C pressure is raised. If the determination at 142a is affirmative, the processing proceeds to 142c, at which the raising of the W/C pressure is stopped in order to maintain the detected W/C pressure.

Thus, by directly detecting the W/C pressure of each W/C 14, 15, 34, 35 and raising the pressure until it reaches the set value PS, each W/C pressure can be brought to the set value PS even though the amount of consumed fluid needed for the pre-charge varies among the brake calipers. Therefore, it becomes possible to perform more suitable pre-charge as in the second embodiment.

Although in this modification the W/C pressure of each one of the W/Cs 14, 15, 34, 35 is detected, detection of the pressure may also be performed for each brake brake system.

Second Modification of Second Embodiment

The slip rate of each tire wheel may also be used as a basis for bringing each W/C pressure to the set value PS. In this case, on the basis of detection signals of the tire wheel speed sensors of the surrounding environment detector portion 2, a slip rate is determined from the tire wheel speeds and an estimated vehicle body speed determined from the tire wheel speeds. If the slip rate exceeds a predetermined value N, it is determined that the corresponding W/C pressure has reached the set value PS.

Figure 15:
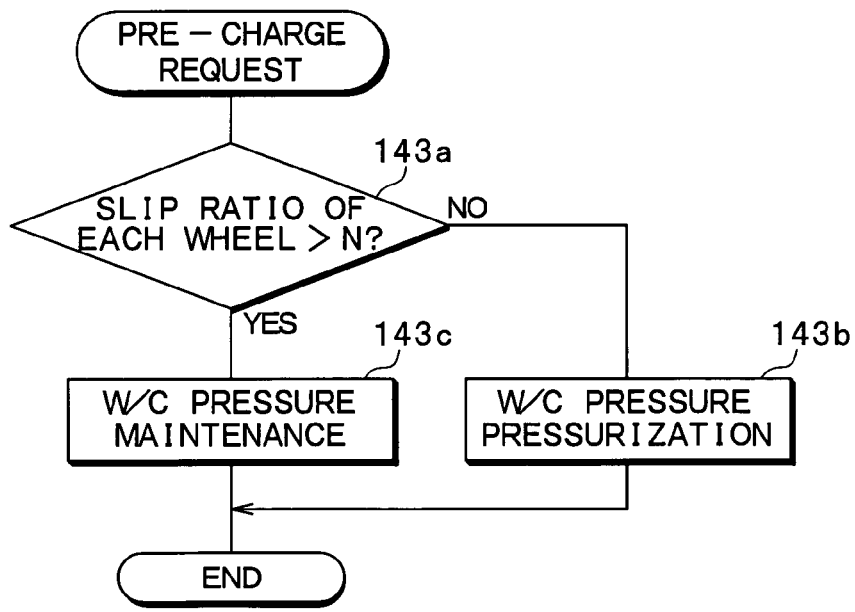
FIG. 15 is a flowchart of a W/C pressure control processing in a second modification of the second embodiment.

FIG. 15 is a flowchart of a W/C pressure control processing in this modification. As in the foregoing second embodiment, this processing is executed when there is a pre-charge request, that is, in the pre-charge control starting processing at 140 in FIG. 3 described above in conjunction with the first embodiment. This processing is executed for each wheel.

Firstly at 143$a$, it is determined whether the slip rate of a wheel is greater than the predetermined value N. If the determination at 143$a$ is negative, the processing proceeds to 143$b$, at which the W/C pressure is raised. If the determination at 143$a$ is affirmative, the processing proceeds to 143$c$, at which the raising of the W/C pressure is stopped in order to maintain the detected W/C pressure.

The slip rate increases as the tire wheel speed drops below the estimated vehicle body speed in accordance with the W/C pressure. Therefore, it is possible to assume that the W/C pressure has reached the set value PS if the slip rate reaches the predetermined value N. Therefore, when the slip rate reaches the predetermined value N, the raising of the W/C pressure is stopped. Incidentally, the predetermined value N can be determined as follows. That is, the braking force that is generatable when the W/C pressure reaches the set pressure PS can be found from the W/C pressure-braking force characteristic. Therefore, the predetermined value N is determined by finding a slip rate corresponding to the set pressure PS from a relationship between the road surface friction coefficient $\mu$ and the slip rate S ($\mu$-S curve) corresponding to the braking force found as described above. Although the slope of the $\mu$-S curve changes in accordance with the road surface friction coefficient $\mu$, the slip rate corresponding to the set value PS is very small, and is represented by only a portion of the rising segment of the $\mu$-S curve. Therefore, it is not necessary to change the predetermined value N in accordance with the change in the slope of the $\mu$-S curve which occurs in accordance with the road surface friction coefficient $\mu$.

Thus, by detecting the slip rate of each wheel and raising the W/C pressure until the slip rate reaches the predetermined value N corresponding to the set value PS, each W/C pressure can be brought to the set value PS even though the amount of consumed fluid needed for the pre-charge varies among the brake calipers. Therefore, it becomes possible to perform more suitable pre-charge as in the foregoing second embodiment. Furthermore, as compared with the first modification, the second modification does not need pressure sensors, so that corresponding simplification of component elements of the vehicular brake control apparatus can be achieved.

Third Embodiment

A third embodiment of the present invention will be described. This embodiment is distinguished from the first embodiment in that the amount of brake fluid used for the pre-charge is changed in accordance with the vehicle speed, although the third embodiment is substantially the same as the first embodiment in terms of, for example, the overall construction of the vehicular brake control apparatus as shown in the block diagram of FIG. 1.

In the first and second embodiments, the amount of brake fluid used for the pre-charge is not changed in accordance with the vehicle speed. However, when the vehicle speed is very low, the effect of the pre-charge becomes small, and therefore the amount of brake fluid used for the pre-charge may be reduced or performance of the pre-charge may be omitted.

Furthermore, if the brake pads have a wheel speed dependency in that, for example, the friction force reduces during high-speed run or the like, it is preferable that the amount of brake fluid used for the pre-charge be greater during a run at a high speed than during a run at a speed that is lower than the aforementioned high speed.

Therefore, the amount of brake fluid used for the pre-charge is increased with the increasing vehicle speed by, for example, determining a set value PS corresponding to the vehicle speed determined via the vehicle speed sensor of the surrounding environment detector portion 2 through the use of a map indicating a relationship between the set value PS and the vehicle speed, and setting an amount of brake fluid corresponding to the set value PS.

Therefore, it becomes possible to perform suitable pre-charge corresponding to the vehicle speed. The changing of the amount of brake fluid used for the pre-charge in accordance with the vehicle speed, described above in conjunction with the third embodiment of the present invention, may also be combined with the first or second embodiment or any one of the modifications of the first and second embodiments.

OTHER EMBODIMENTS

Although the execution of the pre-charge through the use of information regarding various roads and road maps obtained from the navigation device is described above in conjunction with the embodiments, the execution of the pre-charge may be limited only to, for example, the cases where the setting of a route has been accomplished by using the navigation device.

Furthermore, although in the foregoing embodiments, the electric signals from the surrounding environment detector portion 2 are input to the pre-charge permission determination portion 4, this arrangement is not essential. For example, in-vehicle communication networks, termed in-vehicle LAN (so-called CAN), are being developed, and various data can be uploaded to the in-vehicle LAN. Such an in-vehicle LAN can also be used to receive data indicating a result of the detection performed by the surrounding environment detector portion 2. In that case, the results of the detection performed by the surrounding environment detector portion 2 may be uploaded to the in-vehicle LAN as data obtained through various operations of an ECU other than the pre-charge permission determination portion 4 (e.g., an engine ECU, a brake ECU, etc.). The present invention is also applicable to this arrangement or construction.

The above-described brake actuator 6 capable of automatic pressurization described above and having brake systems indicated in FIG. 3 is merely an example. The brake actuator 6 may have any structure as long as the brake actuator 6 is capable of automatic pressurization. For example, a hydro booster that uses an electro-hydraulic pump to perform assist may be used as a brake actuator 6. Furthermore, the brake actuator 6 is not limited to a hydraulic brake construction. For example, an electric brake that electrically generates braking force may be used as a brake actuator 6.

Still further, in a case where the vehicle starts after stopping at an intersection, the brake is in a state where braking force has already been generated and the W/C pressure has been raised. Therefore, if the vehicular brake control apparatus is designed to perform the pre-charge only during such a brake state, the maintenance of a portion of the then-existing W/C pressure will suffice and therefore the brake actuator 6 does not need to have a construction capable of automatic pressurization.

While the above description is of the preferred embodiments of the present invention, it should be appreciated that the invention may be modified, altered, or varied without deviating from the scope and fair meaning of the following claims.

What is claimed is:

1. A vehicular brake control apparatus comprising:
   a braking force control device that controls braking force on a vehicle by pressing a friction-applying member provided in the vehicle against a friction-receiving member;
   a surrounding environment detector device that detects an ambient environment outside the vehicle; and
   a pre-charge permission determination portion that determines whether the ambient environment detected by the surrounding environment detector device meets a predetermined criterion, wherein:
   if it is determined by the pre-charge permission determination portion that the ambient environment detected by the surrounding environment detector device meets the predetermined criterion, the braking force control device executes a pre-charge control of reducing or eliminating an ineffective stroke between the friction-applying member and the friction-receiving member;
   the surrounding environment detector device includes a navigation device that stores a road map and road information regarding roads contained in the road map and detects, via the navigation device, information regarding a road that the vehicle follows as the ambient environment;
   the pre-charge permission determination portion determines whether driving along the road is risky on the basis of the road information and the road map stored in the navigation device;
   the braking force control device executes the pre-charge control if it is determined by the pre-charge permission determination portion that driving the road is risky;
   the surrounding environment detector device includes a vehicle speed detector device that produces an output corresponding to a vehicle speed of the vehicle;
   the pre-charge permission determination portion determines whether there is possibility of the vehicle overrunning a stop-requiring position or a vicinity of the stop-requiring position, or whether there is possibility of the vehicle overrunning an intersection that is not equipped with a traffic signal or a vicinity of the intersection, from a present vehicle speed on the basis of the output of the vehicle speed detector and the road information and the road map stored in the navigation device; and
   the braking force control device executes the pre-charge control if it is determined from the present vehicle speed by the pre-charge permission determination portion that there is possibility of the vehicle overrunning the stop-requiring position or the vicinity of the stop-requiring position, or whether there is possibility of the vehicle overrunning the intersection that is not equipped with a traffic signal or the vicinity of the intersection.

2. The vehicular brake control apparatus according to claim 1, wherein;
   the surrounding environment detector device includes a behavior detector device that produces an output corresponding to a driver's behavior;
   the pre-charge permission determination portion determines whether the driver's behavior corresponds to a road route that the vehicle is to follow on the basis of the output of the behavior detector device and the road information and the road map stored in the navigation device; and
   the braking force control device executes the pre-charge control if it is determined by the pre-charge permission determination portion that the driver's behavior does not correspond to the road route that the vehicle is to follow.

3. The vehicular brake control apparatus according to claim 1, further comprising a braking operation detector device that detects a state of operation of a brake operating member provided in the vehicle and that sends an output corresponding to the state of operation of the brake operating member to the pre-charge permission determination portion, wherein:
   if, during the pre-charge, the braking operation detector device detects that the brake operating member is operated, the pre-charge permission determination portion determines whether an amount of pressurization generated by an operation of the brake operating member so as to press the friction-applying member against the friction-receiving member has become greater than an amount of pressurization generated by the pre-charge so as to press the friction-applying member against the friction-receiving member; and
   the braking force control device ends the pre-charge control if the amount of pressurization generated by the operation of the brake operating member has become greater than the amount of pressurization generated by the pre-charge.

4. The vehicular brake control apparatus according to claim 1, wherein:
   each wheel of the vehicle is provided with a brake caliper for pressing the friction-applying member against the friction-receiving member, and
   the braking force control device sets the amount of brake fluid used for executing the pre-charge control at different values corresponding to specifications of the brake calipers.

5. The vehicular brake control apparatus according to claim 1, wherein:
   the braking force control device controls the amount of brake fluid used for executing the pre-charge control to an amount corresponding to the vehicle speed on the basis of the output of the vehicle speed detector device.

6. The vehicular brake control apparatus according to claim 5, wherein if the braking force control device detects from the output of the vehicle speed detector device that the vehicle speed is lower than a predetermined vehicle speed, the braking force control device causes the amount of brake fluid used for executing the pre-charge control to become less than the amount of brake fluid that is used for the pre-charge control when the vehicle speed is higher than or equal to the predetermined vehicle speed, or omits execution of the pre-charge control.

7. The vehicular brake control apparatus according to claim 5, wherein the braking force control device increases the amount of brake fluid used for executing the pre-charge control in accordance with increase in the vehicle speed on the basis of the output of the vehicle speed detector device.

8. The vehicular brake control apparatus according to claim 1, wherein:
   the surrounding environment detector device includes an infrastructure information input device capable of acquiring vehicle information regarding a preceding vehicle or an image recognition device that inputs an image of the preceding vehicle;

the pre-charge permission determination portion determines whether a braking operation of the preceding vehicle has occurred from the vehicle information regarding the preceding vehicle acquired by the infrastructure information input device or the image of the preceding vehicle acquired by the image recognition device; and the braking force control device executes the pre-charge control if it is determined by the pre-charge permission determination portion that a braking operation of the preceding vehicle has occurred.

9. The vehicular brake control apparatus according to claim 8, wherein the surrounding environment detector device includes a distance detector device that detects distance to the preceding vehicle;

the pre-charge permission determination portion determines whether a condition that an inter-vehicle distance to the preceding vehicle detected from an output of the distance detector device is less than a first predetermined value and that a relative speed with respect to the preceding vehicle determined from a rate of change of the inter-vehicle distance is greater than a second predetermined value is met; and the braking force control device executes the pre-charge control if it is determined by the pre-charge permission determination portion that the condition is met.

10. The vehicular brake control apparatus according to claim 1, wherein:

the surrounding environment detector device includes an infrastructure information input device capable of acquiring vehicle information regarding a laterally adjacent vehicle or an image recognition device that inputs an image of a laterally adjacent vehicle; and the pre-charge permission determination portion determines whether the laterally adjacent vehicle is about to cut in front from the vehicle information regarding the laterally adjacent vehicle acquired by the infrastructure information input device or the image of the laterally adjacent vehicle acquired by the image recognition device; and the braking force control device executes the pre-charge control if it is determined by the pre-charge permission determination portion that the laterally adjacent vehicle is about to cut in front.

11. The vehicular brake control apparatus according to claim 10, wherein:

the surrounding environment detector device includes a distance detector device that detects distance to the laterally adjacent vehicle;

the pre-charge permission determination portion determines whether a condition that an inter-vehicle distance to the laterally adjacent vehicle detected from an output of the distance detector device is less than a third predetermined value and that a relative speed with respect to the laterally adjacent vehicle is greater than a fourth predetermined value is met; and the braking force control device executes the pre-charge control if it is determined by the pre-charge permission determination portion that the condition is met.

12. The vehicular brake control apparatus according to claim 1, further comprising an in-cabin warning device that is provided in a cabin of the vehicle and that produces a warning if the pre-charge permission determination portion produces an output indicating a result of determination that the ambient environment detected by the surrounding environment detector device meets the predetermined criterion.

13. The vehicular brake control apparatus according to claim 1, wherein:

the surrounding environment detector device includes an infrastructure information input device capable of acquiring infrastructure information;

the pre-charge permission determination portion determines whether the infrastructure information acquired by the infrastructure information input device meets the predetermined criterion; and the braking force control device executes the pre-charge control if it is determined by the pre-charge permission determination portion that the infrastructure information acquired by the infrastructure information input device meets the predetermined criterion.

14. A vehicular brake control apparatus comprising:

a braking force control device that controls braking force on a vehicle by pressing a friction-applying member provided in the vehicle against a friction-receiving member;

a surrounding environment detector device that detects an ambient environment outside the vehicle; and a pre-charge permission determination portion that determines whether the ambient environment detected by the surrounding environment detector device meets a predetermined criterion, wherein:

if it is determined by the pre-charge permission determination portion that the ambient environment detected by the surrounding environment detector device meets the predetermined criterion, the braking force control device executes a pre-charge control of reducing or eliminating an ineffective stroke between the friction-applying member and the friction-receiving member;

the surrounding environment detector device includes a navigation device that stores a road map and road information regarding roads contained in the road map, and detects, via the navigation device, information regarding a road that the vehicle follows as the ambient environment;

the pre-charge permission determination portion determines whether driving along the road is risky on the basis of the road information and the road map stored in the navigation device;

the braking force control device executes the pre-charge control if it is determined by the pre-charge permission determination portion that driving the road is risky;

the surrounding environment detector device includes a right-and-left turn detector device that detects whether the vehicle is about to turn right or left;

the pre-charge permission determination portion determines whether there is possibility of the vehicle turning right or left on the basis of an output of the right-and-left turn detector device and the road information and the road map stored in the navigation device; and the braking force control device executes the pre-charge control if it is determined by the pre-charge permission determination portion that there is possibility of the vehicle turning right or left.

15. The vehicular brake control apparatus according to claim 14, wherein:

the surrounding environment detector device includes a vehicle speed detector device that produces an output corresponding to a vehicle speed of the vehicle;

the pre-charge permission determination portion determines whether the vehicle is about to turn right or left in a situation where the vehicle starts to run again after verification of a stop of the vehicle at an intersection on the basis of the output of the right-and-left turn detector device, the output of the vehicle speed detector device, and the road information and the road map stored in the navigation device; and the braking force control device executes the pre-charge control if it is determined by the pre-charge permission determination portion that there is possibility of the vehicle turning right or left.

16. The vehicular brake control apparatus according to claim 14, wherein;

the surrounding environment detector device includes a behavior detector device that produces an output corresponding to a driver's behavior;

the pre-charge permission determination portion determines whether the driver's behavior corresponds to a road route that the vehicle is to follow on the basis of the output of the behavior detector device and the road information and the road map stored in the navigation device; and the braking force control device executes the pre-charge control if it is determined by the pre-charge permission determination portion that the driver's behavior does not correspond to the road route that the vehicle is to follow.

17. The vehicular brake control apparatus according to claim 14, further comprising a braking operation detector device that detects a state of operation of a brake operating member provided in the vehicle and that sends an output corresponding to the state of operation of the brake operating member to the pre-charge permission determination portion, wherein:

if, during the pre-charge, the braking operation detector device detects that the brake operating member is operated, the pre-charge permission determination portion determines whether an amount of pressurization generated by an operation of the brake operating member so as to press the friction-applying member against the friction-receiving member has become greater than an amount of pressurization generated by the pre-charge so as to press the friction-applying member against the friction-receiving member; and the braking force control device ends the pre-charge control if the amount of pressurization generated by the operation of the brake operating member has become greater than the amount of pressurization generated by the pre-charge.

18. The vehicular brake control apparatus according to claim 14, wherein:

each wheel of the vehicle is provided with a brake caliper for pressing the friction-applying member against the friction-receiving member, and the braking force control device sets the amount of brake fluid used for executing the pre-charge control at different values corresponding to specifications of the brake calipers.

19. The vehicular brake control apparatus according to claim 14, wherein:

the braking force control device controls the amount of brake fluid used for executing the pre-charge control to an amount corresponding to the vehicle speed on the basis of the output of the vehicle speed detector device.

20. The vehicular brake control apparatus according to claim 14, further comprising an in-cabin warning device that is provided in a cabin of the vehicle and that produces a warning if the pre-charge permission determination portion produces an output indicating a result of determination that the ambient environment detected by the surrounding environment detector device meets the predetermined criterion.

* * * * *